(12) United States Patent
Sinclair et al.

(10) Patent No.: US 11,658,888 B2
(45) Date of Patent: May 23, 2023

(54) NETWORK TIMING TRAIL VISUALIZATION AND METHOD OF TROUBLESHOOTING

(71) Applicant: Ciena Corporation, Hanover, MD (US)

(72) Inventors: Peter Brett Sinclair, Cambridge (CA); David Charles Steele, Richmond (CA); Blair Edward Paul Moxon, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/680,678

(22) Filed: Feb. 25, 2022

(65) Prior Publication Data

US 2022/0376997 A1 Nov. 24, 2022

Related U.S. Application Data

(60) Provisional application No. 63/190,462, filed on May 19, 2021.

(51) Int. Cl.
| | |
|---|---|
| *G06F 15/173* | (2006.01) |
| *H04L 43/045* | (2022.01) |
| *H04L 41/12* | (2022.01) |
| *H04L 43/067* | (2022.01) |

(52) U.S. Cl.
CPC .......... *H04L 43/045* (2013.01); *H04L 41/12* (2013.01); *H04L 43/067* (2013.01)

(58) Field of Classification Search
CPC .............................. H04L 43/045; H04L 41/12
See application file for complete search history.

(56) References Cited

U.S. PATENT DOCUMENTS

| | | | |
|---|---|---|---|
| 5,982,455 | A | 11/1999 | Steele et al. |
| 6,259,837 | B1 | 7/2001 | De Boer et al. |
| 6,400,859 | B1 | 6/2002 | De Boer et al. |
| 6,941,359 | B1 | 9/2005 | Beaudoin et al. |
| 7,107,496 | B1 | 9/2006 | D'Ippolito et al. |
| 7,149,975 | B1 | 12/2006 | Johnson et al. |
| 9,767,179 | B2 | 9/2017 | Grignon et al. |

(Continued)

FOREIGN PATENT DOCUMENTS

| | | |
|---|---|---|
| CA | 2287844 A1 | 5/2001 |
| CA | 2365963 A1 | 6/2003 |
| EP | 0928117 A2 | 7/1999 |

*Primary Examiner* — Padma Mundur
(74) *Attorney, Agent, or Firm* — Baratta Law PLLC; Lawrence A. Baratta, Jr.

(57) ABSTRACT

A network timing view provides enhanced visualization for synch timing in support of mobile (4G/5G deployments) and others requiring sync. It allows network managers to view relevant synch data both textually and graphically displayed on the network map nodes and links in a unified view. The user is able to select the appropriate filter on the network map to show the 1588/SyncE connectivity and relevant nodes that are participating in delivering timing. It allows a user to trace the timing path from any timing device upstream to the clock source. It also allows the user to interactively discover and navigate downstream timing paths from any timing device, similar to exploring a tree hierarchy. The timing topology and path data provided allows a user to investigate the timing network for troubleshooting purposes such as timing alarms and events, sync problems, clock quality levels and clock states.

20 Claims, 43 Drawing Sheets

(56) References Cited

U.S. PATENT DOCUMENTS

| | | |
|---|---|---|
| 11,101,884 B1 | 8/2021 | Campbell et al. |
| 2011/0051726 A1* | 3/2011 | Bejerano ............. H04L 12/1877 |
| | | 370/390 |
| 2012/0324270 A1* | 12/2012 | Magee .................... H03L 7/099 |
| | | 713/400 |
| 2013/0283174 A1* | 10/2013 | Faridian ................. H04L 41/06 |
| | | 709/224 |
| 2015/0207579 A1* | 7/2015 | Chapman .............. H04J 3/0682 |
| | | 370/503 |
| 2015/0248212 A1 | 9/2015 | Breedvelt-Schouten et al. |
| 2022/0014441 A1* | 1/2022 | Sethi ....................... H04L 41/12 |

\* cited by examiner

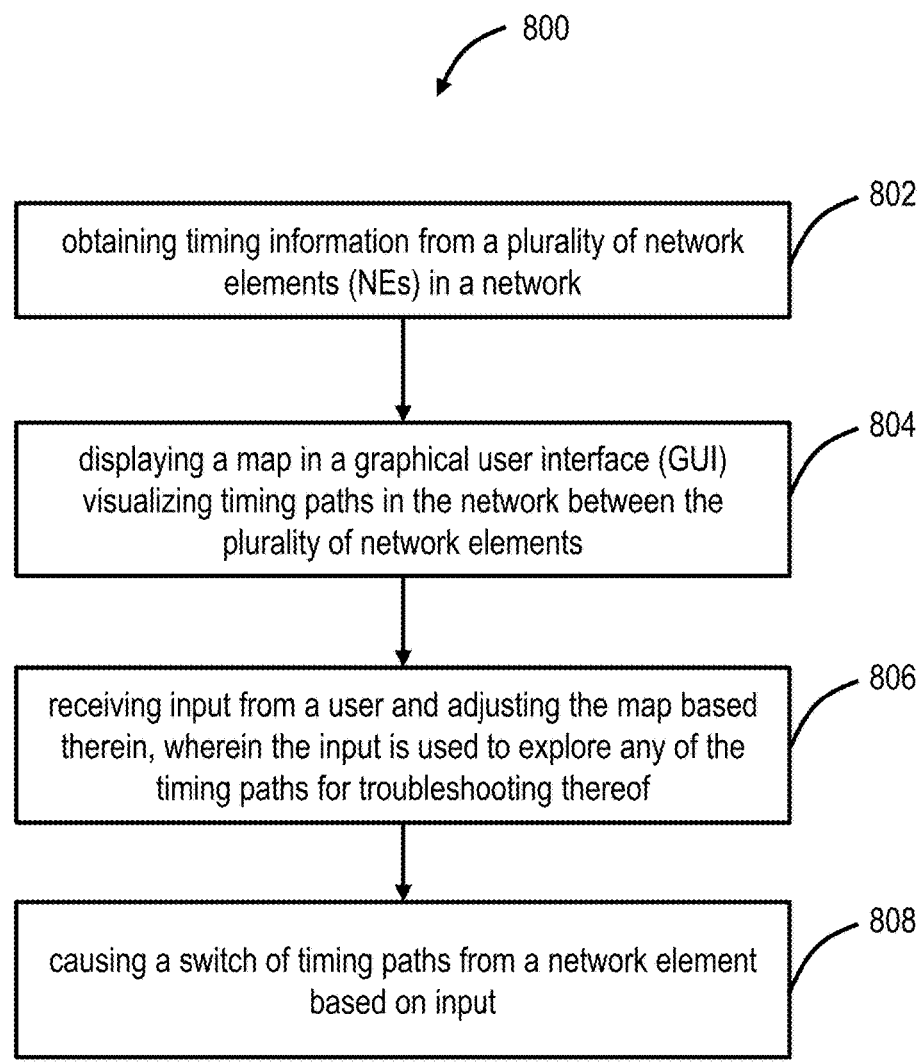

NETWORK TIMING TRAIL VISUALIZATION AND METHOD OF TROUBLESHOOTING

CROSS-REFERENCE TO RELATED APPLICATION(S)

The present disclosure claims priority to U.S. Provisional Patent Application No. 63/190,462, filed May 19, 2021, the contents of which are incorporated by reference in their entirety.

FIELD OF THE DISCLOSURE

The present disclosure generally relates to networking. More particularly, the present disclosure relates to network timing trail visualization and method of troubleshooting.

BACKGROUND OF THE DISCLOSURE

Precision timing is a critical requirement for 5G services. In a network, timing is distributed between network elements (nodes) in a timing trail. For example, a first network element can have a grandmaster clock and use various protocols to distribute timing to other network elements for clock synchronization. The protocols generally include Synchronous Ethernet (SyncE) and Precision Time Protocol (PTP). SyncE is defined in ITU-T Rec. G.8261 that defines aspects about the architecture and the wander performance of SyncE networks, ITU-T Rec. G.8262 that specifies Synchronous Ethernet clocks for SyncE, and ITU-T Rec. G.8264 that describes the specification of Ethernet Synchronization Messaging Channel (ESMC), the contents of each of these are incorporated by reference.

PTP is defined, e.g., in IEEE 1588v2 (2008), IEEE Standard for a Precision Clock Synchronization Protocol for Networked Measurement and Control Systems, the contents of which are incorporated by reference.

For example, SyncE can be used for frequency synchronization while PTP can be used for phase synchronization and Time of Day (TOD) synchronization.

Precision timing is critical to many sectors of the economy, ranging from legal requirements in financial services to reliable land-based infrastructure and services, mobile deployments, accurate GPS mapping etc.

There is a need to provide tools and methods to ensure a proper timing network.

BRIEF SUMMARY OF THE DISCLOSURE

The present disclosure relates to network timing trail visualization and method of troubleshooting.

In various embodiments, the present disclosure includes a method having steps, a system including at least one processor and memory with instructions that, when executed, cause the at least one processor to implement the steps, and a non-transitory computer-readable medium having instructions stored thereon for programming at least one processor to perform the steps.

A method includes obtaining timing information from a plurality of network elements in a network, displaying a map visualizing timing trails in the network between the plurality of network elements, receiving input from a user and adjusting the map based therein, wherein the input is used to explore any of the timing trails for troubleshooting thereof, and causing a switch of timing trails from a network element based on input.

In an embodiment, a non-transitory computer-readable medium includes instructions that, when executed, cause one or more processors to perform steps of: obtaining timing information from a plurality of network elements (NEs) in a network; displaying a map in a graphical user interface (GUI) visualizing timing paths in the network between the plurality of network elements; and receiving input from a user and adjusting the map based therein, wherein the input is used to explore any of the timing paths for troubleshooting thereof. The steps may further include causing a switch of timing paths from a network element based on input. The timing information includes a timing distribution protocol and any upstream or downstream network elements in timing paths which are a path illustrating distribution of timing from a clock source. The steps may further include displaying visual indicators for clock states and clock types on the map. The steps may further include displaying a timing path that includes a highlighted path and arrows showing a direction from a clock source. The steps may further include displaying quality indicators of a clock at one or more network elements. The map may be a 3D multi-layer visualization.

In another embodiment a method includes the steps of: obtaining timing information from a plurality of network elements (NEs) in a network; displaying a map in a graphical user interface (GUI) visualizing timing paths in the network between the plurality of network elements; and receiving input from a user and adjusting the map based therein, wherein the input is used to explore any of the timing paths for troubleshooting thereof. The steps may further include causing a switch of timing paths from a network element based on input. The timing information includes a timing distribution protocol and any upstream or downstream network elements in timing paths which are a path illustrating distribution of timing from a clock source. The steps may further include displaying visual indicators for clock states and clock types on the map. The steps may further include displaying a timing path that includes a highlighted path and arrows showing a direction from a clock source. The steps may further include displaying quality indicators of a clock at one or more network elements. The map may be a 3D multi-layer visualization.

In a further embodiment, an apparatus includes: one or more processors; and memory storing instructions that, when executed, cause the one or more processors to: obtain timing information from a plurality of network elements (NEs) in a network; display a map in a graphical user interface (GUI) visualizing timing paths in the network between the plurality of network elements; and receive input from a user and adjusting the map based therein, wherein the input is used to explore any of the timing paths for troubleshooting thereof. The steps may further include causing a switch of timing paths from a network element based on input. The timing information includes a timing distribution protocol and any upstream or downstream network elements in timing paths which are a path illustrating distribution of timing from a clock source. The steps may further include displaying visual indicators for clock states and clock types on the map. The steps may further include displaying a timing path that includes a highlighted path and arrows showing a direction from a clock source. The steps may further include displaying quality indicators of a clock at one or more network elements. The map may be a 3D multi-layer visualization.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 8 is a flowchart showing a process of an embodiment of the 3D multi-layer network timing construct visualization of the present disclosure.

DETAILED DESCRIPTION OF THE DISCLOSURE

Figure 1A:
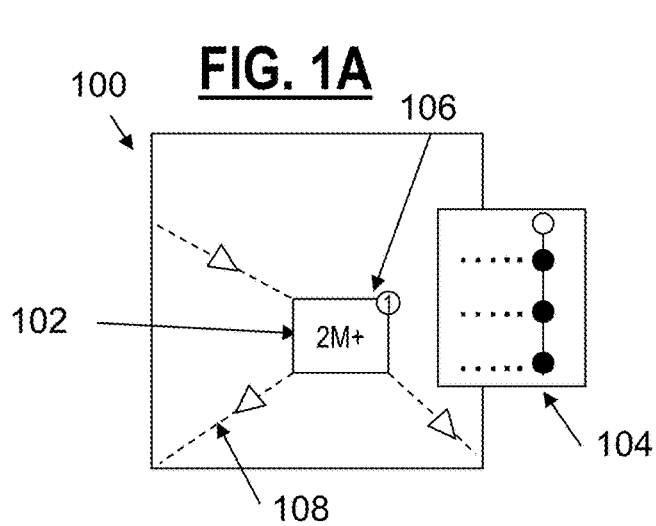
FIG. 1 includes various screenshots (FIG. 1A-1E) of a network timing trail tool and various associated user actions.

The present disclosure relates to network timing trail visualization and method of troubleshooting.

In an embodiment, a network timing trail visualization tool is provided. The tool can be implemented via a Network Management System (NMS), Element Management System (EMS), a Software Defined Networking (SDN) application, or the like.

FIGS. 1-7 are various screenshots of a network timing trail tool and various associated use cases.

In the FIGS., a map is provided that displays network elements (boxes) that are Layer 0, 1, 2, and/or 3 devices. For example, the network elements can be packet switches, Packet-Optical Transport Systems (POTS), etc. The map displays information related to network timing trails. As described herein, a network timing trail is a logical view of how timing is distributed between nodes, i.e., from one node to other nodes in a chain as well as a tree.

This network timing application provides enhanced visualization for synch timing in support of mobile (4G/5G deployments) and others requiring sync. It allows network managers to view relevant synch data both textually and graphically displayed on the network map nodes and links in a unified view. The user is able to select the appropriate filter on the network map to show the 1588/SyncE connectivity and relevant nodes that are participating in delivering timing. It allows a user to trace the timing path from any timing device upstream to the clock source. It also allows the user to interactively discover and navigate downstream timing paths from any timing device, similar to exploring a tree hierarchy.

The timing topology and path data provided allows a user to investigate the timing network for troubleshooting purposes such as timing alarms and events, sync problems, clock quality levels and clock states.

For example, a user could select a timing path and run tests for performance to optimize the timing network.

Another scenario would be to compare and select among various node clock types and quality levels if a user needs to re-route a timing path due to a failure.

Features

Network Node and Topology map with option to select a network timing overlay view but that view is L0-L2 view which provides additional context. e.g., L2 nodes with photonic nodes in between.

A targeted/selected view of dynamic real-time topology exploration which provides better real-time performance.

A two click approach to view a selected NE's timing source path. e.g., click a network device on the map and click a button to visually trace the timing path to the source grandmaster clock. This also lists the path details on the timing panel.

Graphical User Interface (GUI) based clock tree exploration.

A geographic based network view coupled with a textual clock path list that describes each hop or element in a selected timing path, showing the key timing details for each device.

Arrows on the path links indicate the direction of where the source timing signal is coming from and where it is going.

A link with an 'arrow symbol blocked by a perpendicular line' indicates that clock is configured in that direction by the output side, but the input side is not using it (for example because it has selected a clock source from a different link).

Visual language to show on the network map, connections for timing protocol types: Frequency, Phase or Both (frequency and phase together).

Clock visual language for various clock states (Locked, Holdover, Acquiring, Free run) and clock types (Grandmaster, Boundary clock, Transparent clock, Ordinary/slave clock).

Active timing path—can also easily get information on nodes and links

Can troubleshoot and allows timing path tests to be executed

Can view adjacent timing source configurations which allows an operator to choose the best available clock and path in case a re-route is required.

Generate and export a CSV report for a selected timing path. This lists in sequence all timing details (e.g., States, quality levels, protocols, inputs and outputs, interfaces, ports etc.) for all devices on the path.

Overlay performance and timing messages for monitoring

Run timing protection reports with network map visualization

Multi-vendor-based solution via Simple Network Management Protocol (SNMP) traps/configuration Overlay $3^{rd}$ party sync solution with a packet/optical transport solution.

Timing alarm specific overlays on network map (a toggle button to show only timing alarms vs. all network alarms)

Extra visualization for nodes in holdover state

Active timing path/tree has contrast visually with respect to the rest of the NEs/links in network map view. For example, when a timing path is selected the other network elements and paths are dimmed slightly so the selected path stands out over the background.
Trace clock tree
Exploration of clock branches (manual/automatic)
+ sign to show optional branches
Clock tree path (freq./phase) which is dynamically built as the user explores
Trace clock source
Set anchor node
Dynamic real-time network scrape of current active clock source
Visualization on a network map with zoom in/out
Arrows showing directionality of master/slave
Illustrates clock states
Illustrate phase and frequency and both (as needed)
SyncE/1588v2 timing support for PTP (Precision Timing Protocol)
Timing view is geo-based context (lat/long)
Sites/grouping/clusters with the timing view
Includes a textual clock source path
    Frequency and Phase views (tabbed)
    Each node in path includes clock configuration and state details
        State
        Clock state duration
        Input/outputs
    Refresh option
Visual language for different types of clocks
    GM clock (grandmaster clock)
    GM clock endpoint
    OC (ordinary clock)
    BC (boundary clock)
    Timing path endpoint (internal clock, external clock)

In an embodiment, the present disclosure provides a method and apparatus for 3D multi-layer network timing construct visualization with Frequency and Phase. This network timing visualization application allows a user to request and view a 3D multi-layer visualization of a network timing construct (e.g. timing trail or a timing tree) augmented with both (or one of) Frequency and Phase elements of a timing construct visualized concurrently. This provides the ability to easily see and understand a network timing construct's multi-layer context for both Frequency and Phase. This gives the user greater insight into where Frequency and Phase routes may not be aligned, into where Frequency and Phase have or do not have underlying transport protection, and into where Frequency and Phase supporting layers state/health/performance to better assist with network timing troubleshooting.

To further enhance Frequency versus Phase visualization, the 3D multi-layer network timing visualization is enhanced using visual language and animation of timing source directionally and flow for each of Frequency and Phase. Visual language is utilized to distinguish between Frequency and Phase where both are visualized in a 3D multi-layer view within the same 'network timing' layer. Further embodiments may additionally include a 3D multi-layer visualized timing trail where both Frequency and Phase are included in the visualization, where the multi-layer path for each is shown and the timing flow from timing source (e.g. from Grandmaster) to a timing client(s) (e.g. Boundary Clock) is animated for both Frequency and Phase. The timing flow animation may be represented as a color from timing source to timing client for Frequency and a different color for Phase.

Phase and Frequency may be split out into each their own layer within a 3D multi-layer visualization (i.e. not combined together in one 'network timing' layer but rather broken out into their own respective layer). This visualization may include controls to specify the vertical ordering with respect to the individual Phase and Frequency layers. Each layer can optionally include overlay of state, alarms, performance, etc. related information.

In an embodiment, a 2D & 3D multi-layer network timing visualization with 3rd party network timing entity context can be utilized. In many real-world network timing deployments, a network timing solution involves multiple vendors. As such, a network timing application which limits the visibility of a network timing trail or tree context to just one vendor's equipment limits the overall context and information being provided to a user. The present network timing application visualization allows a user to view a 2D or 3D multi-layer network timing construct visualization (e.g. timing trail or timing tree) augmented with 3rd party network timing entity context and information. A network management system adds support for 3rd party network timing entities. 3rd party network timing entity management support includes modeling the entity and integrating it into a multi-layer network data model. 3rd party network timing entity information can include, but is not limited to, name, vendor, version, management address, serial number, location, configuration, topology connectivity to natively managed devices and/or other 3rd party network timing entities, discovered state information, timing hops consumed along topology connectivity, etc.

A network management system supports two types of 3rd party network timing entities, in part, for enhanced 2D/3D multi-layer network timing construct (e.g. timing trail, timing tree) visualization. The two types of 3rd party network timing entities are 3rd party timing devices, and logical 3rd party timing domain.

A network management system supports the addition and integration of a 3rd party network timing device which is connected to natively managed network timing device(s) and/or another 3rd party timing device(s). A typical example of this is a 3rd Grandmaster Clock device which is connected to natively managed equipment. With respect to multi-layer 2D/3D network timing construct visualization, an integrated 3rd party network timing device is included in the visualization to enhance network timing context.

A network management system supports the addition and integration of a logical 3rd network timing domain which is connected to a natively managed network timing device(s), and/or a 3rd party timing device(s), and/or another logical 3rd party timing domain. In a timing network, there are deployment scenarios where 3rd party network timing devices are used as intermediate transit devices. Normally, a network management system only has visibility of the native network timing nodes it manages and as such does not have visibility to the 3rd party timing devices nor how many timing hops the 3rd party timing devices consume which is critical information in timing networks. With respect to multi-layer 2D/3D network timing construct visualization, if a network timing construct (e.g. timing trail) passes through a logical 3rd party network timing domain this logical 3rd party network timing domain is included in the network timing construct visualization, again to enhance timing context for a user. The 3rd party network timing domain could be represented visually as a named cloud object connected to one or more network timing devices.

Other embodiments include interactive visual exploration and construction of a 3D multi-layer network timing clock tree. The network timing visualization application provides the user with an enriched visual network timing context where the user can interactively and visually explore a network timing clock tree and have a 3D multi-layer network timing tree constructed automatically including Phase, Frequency, and other timing information provided as the user explores. Fundamentally, a user can select any timing node (e.g. Grandmaster, Boundary Clock, Slave Clock, managed 3rd party timing entity) in the timing network and start exploring the connectivity and be presented with a 3D multi-layer network timing clock tree visualization. The user is able to select a network timing node on a graphical network map as a starting context. The user is then visually presented with a set of configured clock tree branches available on the selected node (ingress and/or egress timing branches). The user selects a timing branch to explore and a 3D multi-layer network timing visualization is constructed and presented automatically. The starting node context plus the multi-layer connectivity to where the timing branch is connected to is automatically and dynamically 3D visualized along with supporting Frequency, Phase, and other timing related information. If the newly shown timing branch node has only one other timing branch on it then based on policy control, the 3D multi-layer visualization can automatically continue and update the UI until there is a new timing branch node with more than one timing branch to explore. At this point, a user can then select any timing branch from any of the displayed timing nodes to explore further in any direction in the same fashion. Frequency, Phase and other timing related information is built-out and provided with the 3D multi-layer network timing visualization as the user explores the network timing landscape. Also supported is the ability to hide, collapse, and expand multi-layer details on a per timing basis during user timing tree exploration. 3D multi-layer network timing visualization timing tree exploration also includes starting with and/or exploring to managed 3rd party network timing entities.

Various embodiments can also include automatic and performant refresh of 2D/3D multi-layer network timing construct visualization. The user is provided with an automatic and performant near real-time refresh of a 2D multi-layer or 3D multi-layer network timing construct visualization so the user can quickly see the effect of network autonomic changes and/or manually initiated network changes which could impact a network timing construct (e.g. link failure which triggers loss of primary timing source to a backup timing source; supporting infrastructure layer performs switch to backup route where the multi-layer visualization would be updated to reflect a change in a supporting infrastructure layer—this could highlight for example that the timing path is taking a physically longer path (i.e. more delay) than before).

This visualization is achieved by combining auto-discovered, persisted, and modeled network timing configuration data with discovered, persisted, and modeled multi-layer network topology and state and retrieved network timing state information including other supporting layer state information and constructing a cache for a multi-layer network timing construct(s) for rapid visual rendering and data reuse. Also automatically updating the cached multi-layer network timing construct visualization context in near real-time based on asynchronously received network configuration change notifications, network topology/state change events, network timing state change events, and/or network alarms which then trigger an automatic resync of required multi-layer network elements supporting the current network timing construct context to retrieve new configuration and/or state information across each of the supporting layers. Monitoring of managed 3rd party network timing devices is also included in the algorithm to update the cache and thus update the 2D/3D multi-layer network timing construct visualization. Additionally, updated cached multi-layer network timing construct visualization is then used to automatically update the current flat, 2D multi-layer, or 3D multi-layer network timing construct visualization.

Further embodiments may additionally include network timing source conflict analyzers with multi-layer node, link, SRLG, and 3rd party timing entity analysis. This provides the user with the ability to perform a timing source conflict analysis on a node(s) basis or on a network wide basis by comparing timing sources against a multi-layer view of each timing path, SRLG configuration, and 3rd party timing entity. A network element generally has multiple timing sources to ensure resiliency in the event of failures. While there may be multiple timing sources configured on a network timing device, some of these timing sources may in fact actually have a common point of failure if one looks at the underlying supporting transport layers, SRLGs, and connected 3rd party timing entities. For example, two timing trail sources for a node may in fact use a common photonic service to reach the network element. Or in another example, two timing trail sources for a node may use two different underlying photonic services to reach the network element but those two photonic services have a shared risk (e.g. SRLG conflict, same conduit). As such, the present disclosure leverages the aforementioned network wide multi-layer data model and network assigned SRLGs and analyzes timing source redundancy for a node(s) or full network to check for timing source nodes, link, and SRLG conflicts across all layers a timing source may be dependent on. The analysis produces a report of timing any source conflicts and where those conflicts occur. The timing source conflict analysis algorithm also includes support to evaluate against managed 3rd party timing entities. For example, a timing node may have a primary and backup timing source configured which when looking in the context of the natively managed network devices appears to not have any conflicts. However, with analysis augmented to evaluate 3rd party timing devices analysis could show that both timing sources are dependent on the same 3rd party Grandmaster.

FIG. 1 is a collection of screenshots of the Graphical User Interface (GUI) 100 of the present disclosure. FIGS. 1A-1E show basic user actions to interact with the GUI 100 of the present disclosure. FIG. 1A shows what a user may see when a Network Element (NE) 102 is selected. A detail pod 104 appears, the detail pod 104 displaying various information regarding the selected NE 102. Additionally, when a NE 102 is selected, the Quality Level (QL) 106 relating to that NE 102 appears. Further, after the selection of a NE 102 on the map, arrows 108 are displayed to represent the network path.

Figure 1B:
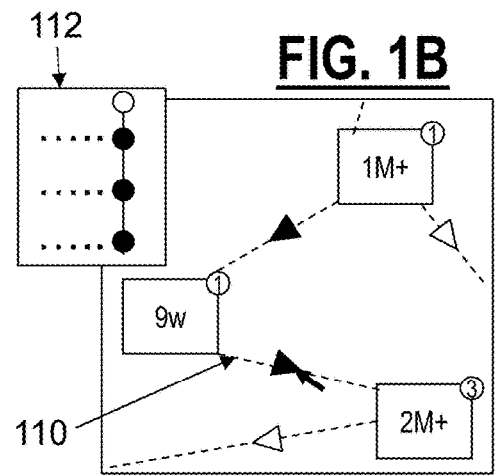

FIG. 1B shows the GUI 100 of the present disclosure after a user selects an arrow 108 on the displayed map. The user may select the arrow 108 by clicking on the arrow 108 or by selecting an option in the NE detail pod 104. When an arrow 108 is selected, a highlighted path 110 appears which leads all the way back to the Grandmaster (GM) or the furthest known clock input source. Each NE 102 along the path 110 is highlighted and the QL 106 is also displayed for each NE 102 along the path 110. The rest of the network on the displayed map is dimmed as to enhance the representation of the highlighted path 110 and plurality of NEs 102. The path 110 is also represented as a list in a drawer panel 112.

Figure 1C:
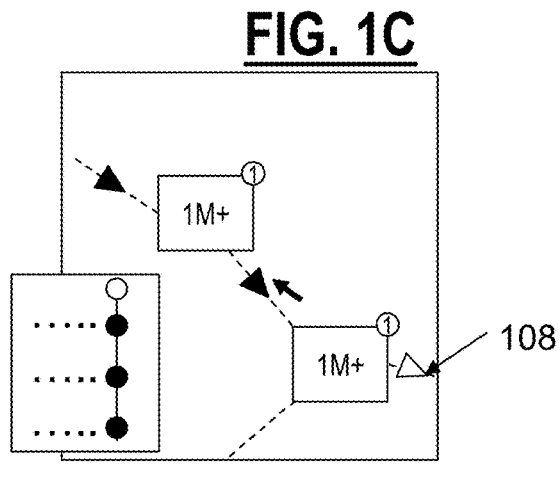

FIG. 1C shows the GUI 100 of the present disclosure when a user selects an additional clock arrow 108. When a user selects an additional clock arrow 108, the output hop representative of the selected arrow 108 is highlighted in addition to the highlighted path 110 leading all the way back to the GM or the furthest known source. The QL 106 is displayed for the additional NE 102 along the path 110 in addition to the previously selected Nes 102. The remainder of the network remains dimmed, only highlighting the selected elements along the path 110. As before, the path is also represented as a list in the drawer panel 112. Additional arrows 108 also appear to continue following the desired path 110.

Figure 1D:
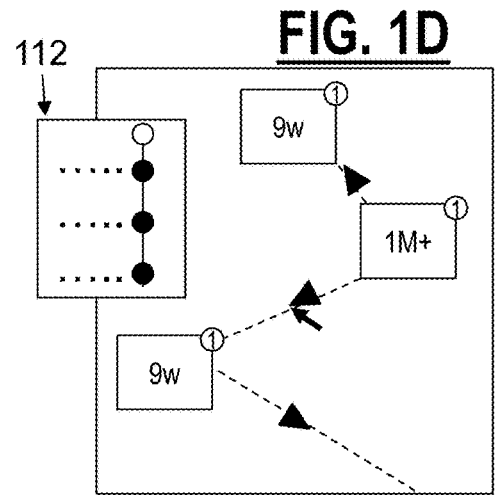

FIG. 1D shows the GUI 100 of the present disclosure when a user selects a specific portion of the path 110 to be displayed in the drawer panel 112. A user is able to select a section of the path 110 by selecting arrows 108. When the user selects a particular arrow 108 or a plurality of arrows 108 in a path 110, the new selected path will be highlighted in a color (e.g., blue), and the remainder of the path 110 will be highlighted in a different color (e.g., grey). The new selected path 110 will be displayed in the drawer panel 112.

Figure 1E:
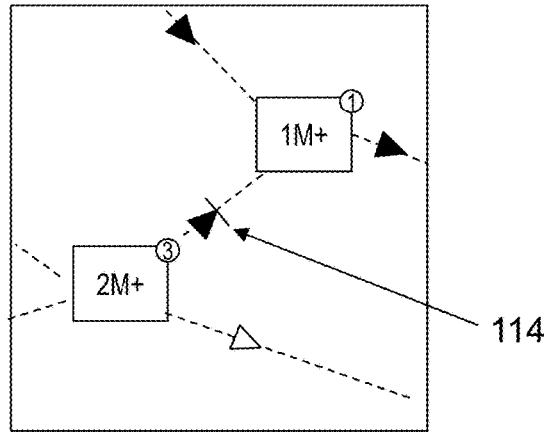

FIG. 1E shows the GUI 100 of the present disclosure displaying a special case wherein the output of an NE 102 is not being used as an input of another NE 102. A blocked arrow 114 will appear between two NEs 102 when this is the case. In the figure, the output of the bottom NE 102 is not being used as the input for the top NE 102, thus the blocked arrow 114 is displayed between the two.

FIG. 2 includes screenshots (FIG. 2A-2H) which show a use case of the network timing trail GUI 100 of the present disclosure. Displayed is a map of NEs 102 and paths 110 linking the plurality of NEs 102 thereon. Shown in FIG. 2A, when the map is in timing mode, it will display basic details relating to the various NEs 102. The details may include clock type (boundary, slave, etc), GMs attached to NEs, and endpoints where the clock is passed no further. In FIG. 2B, when an NE is selected, the map will display the QL 106 and input/output arrows 108 for the selected NE 102. Additionally, when an NE 102 is selected, a detail pod 104 will appear, displaying additional information regarding the selected NE 102.

Figure 2A:
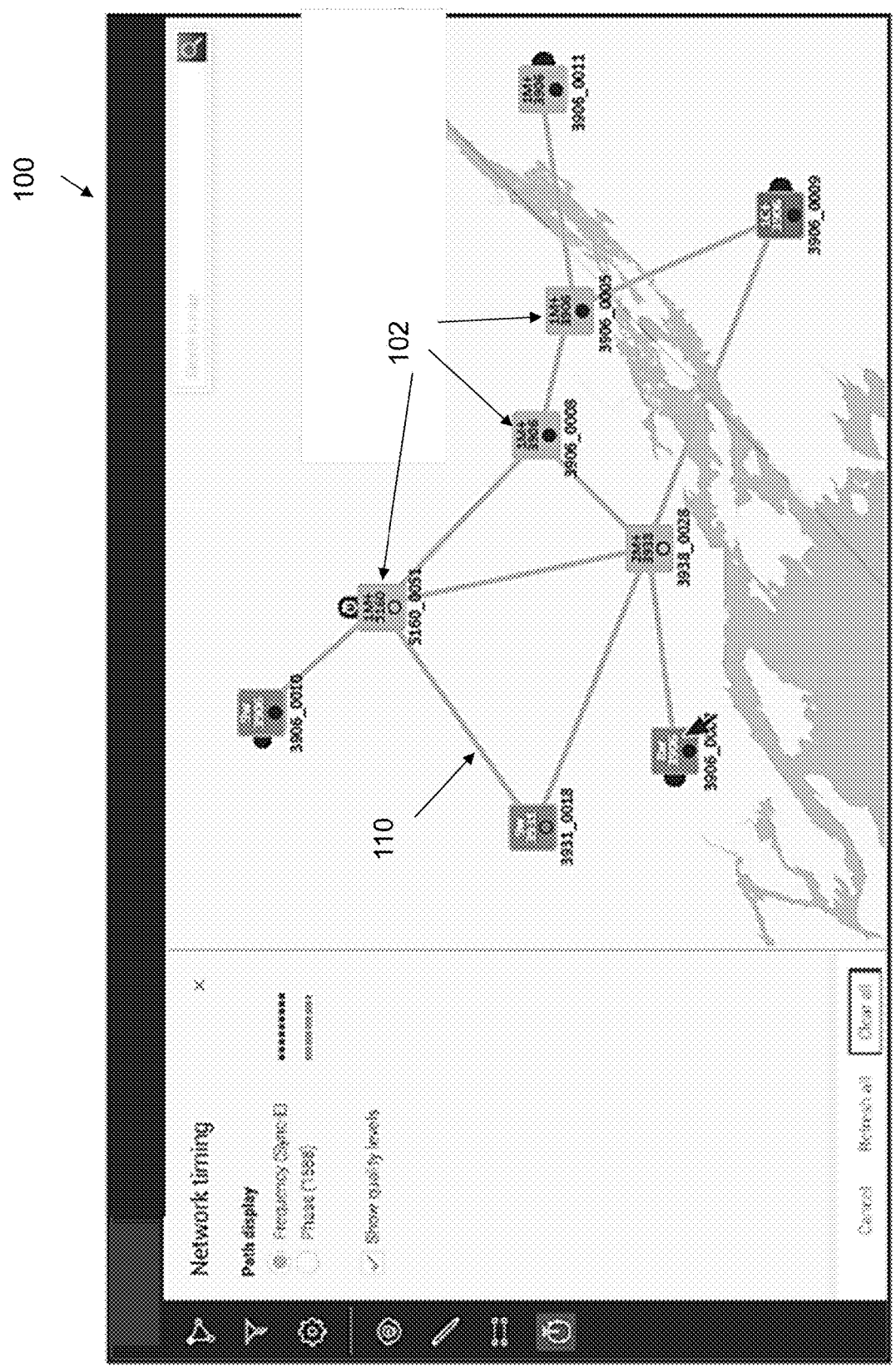
FIG. 2 includes screenshots (FIG. 2A-2H) which show a use case of the network timing trail interface of the present disclosure.
Figure 2B:
Figure 2C:
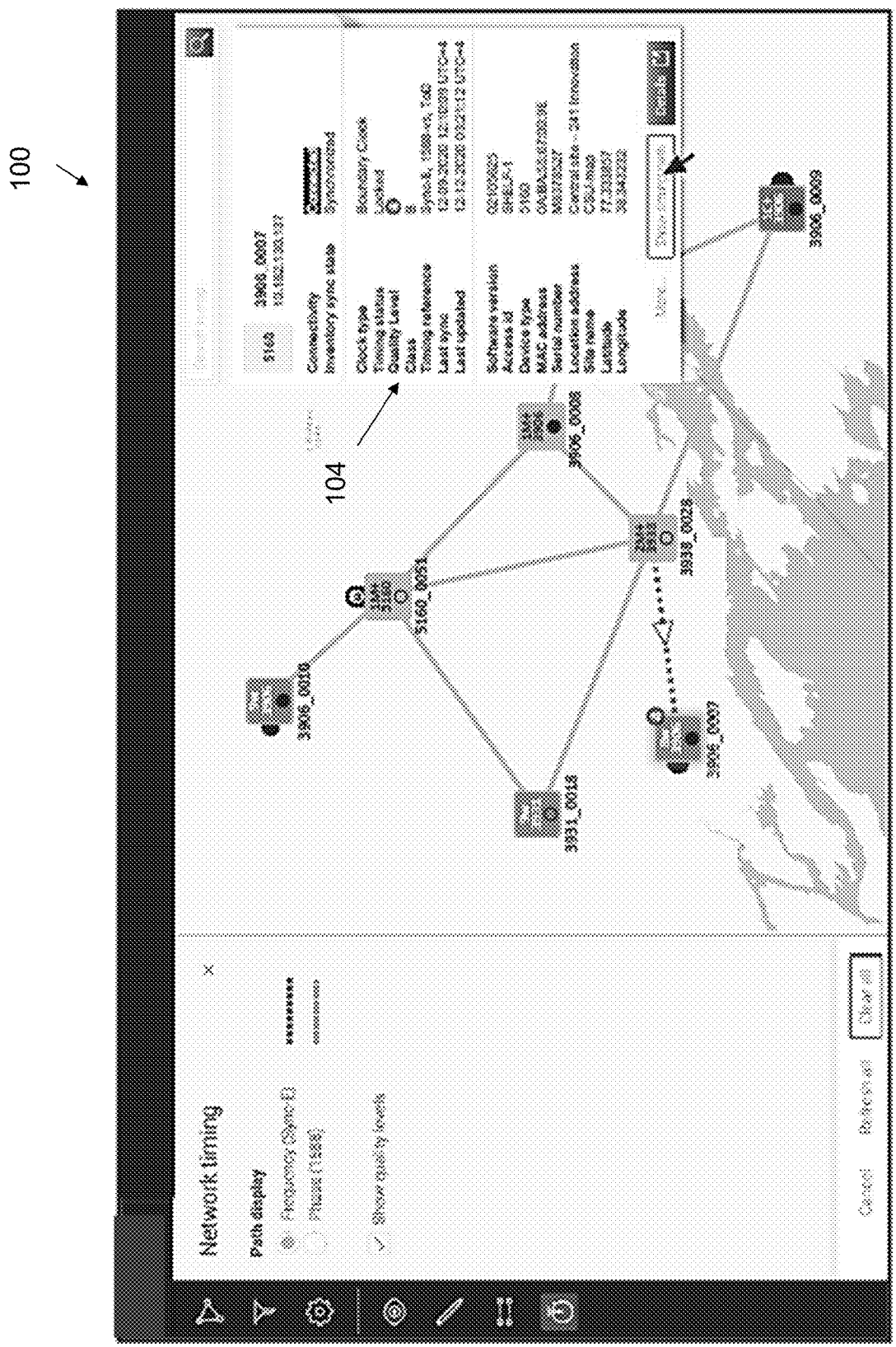
Figure 2D:
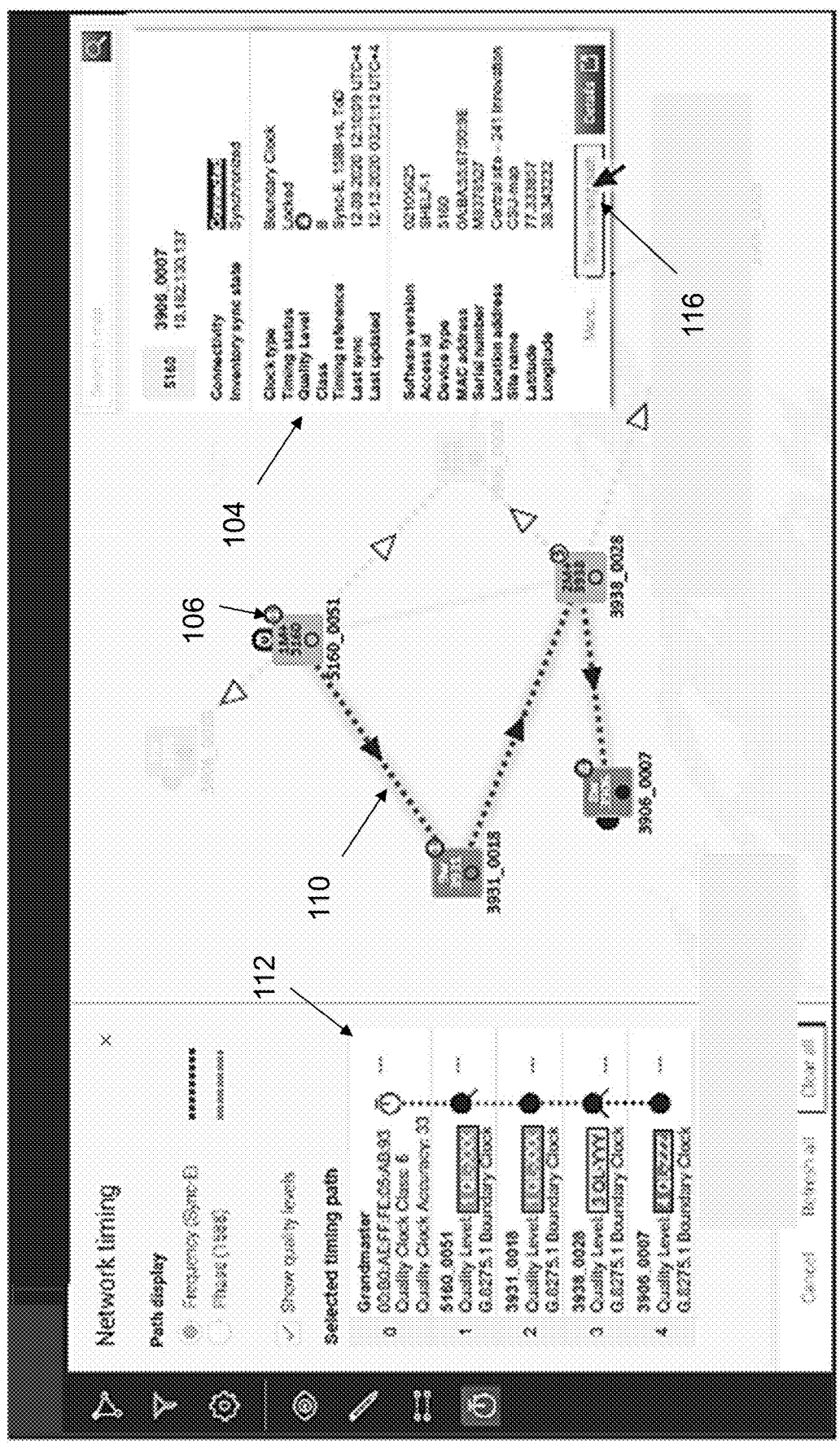

FIG. 2C and FIG. 2D show user interaction options with the GUI 100 of the present disclosure through the detail pod 104. Once a user is presented with the detail pod 104 after selecting an NE 102, the user can review the information displayed as well as perform additional actions. The user can select the "show timing path" button 116 to highlight the path 110 which leads all the way back to the Grandmaster (GM) or the furthest known clock input source. Each NE 102 along the path 110 is highlighted and the QL 106 is also displayed for each NE 102 along the path 110. The rest of the network on the displayed map is dimmed as to enhance the representation of the highlighted path 110 and plurality of NEs 102. The drawer panel 112 appears and shows details for the selected timing path 110 as a flat list, ordered by hop count from the GM.

Figure 2E:
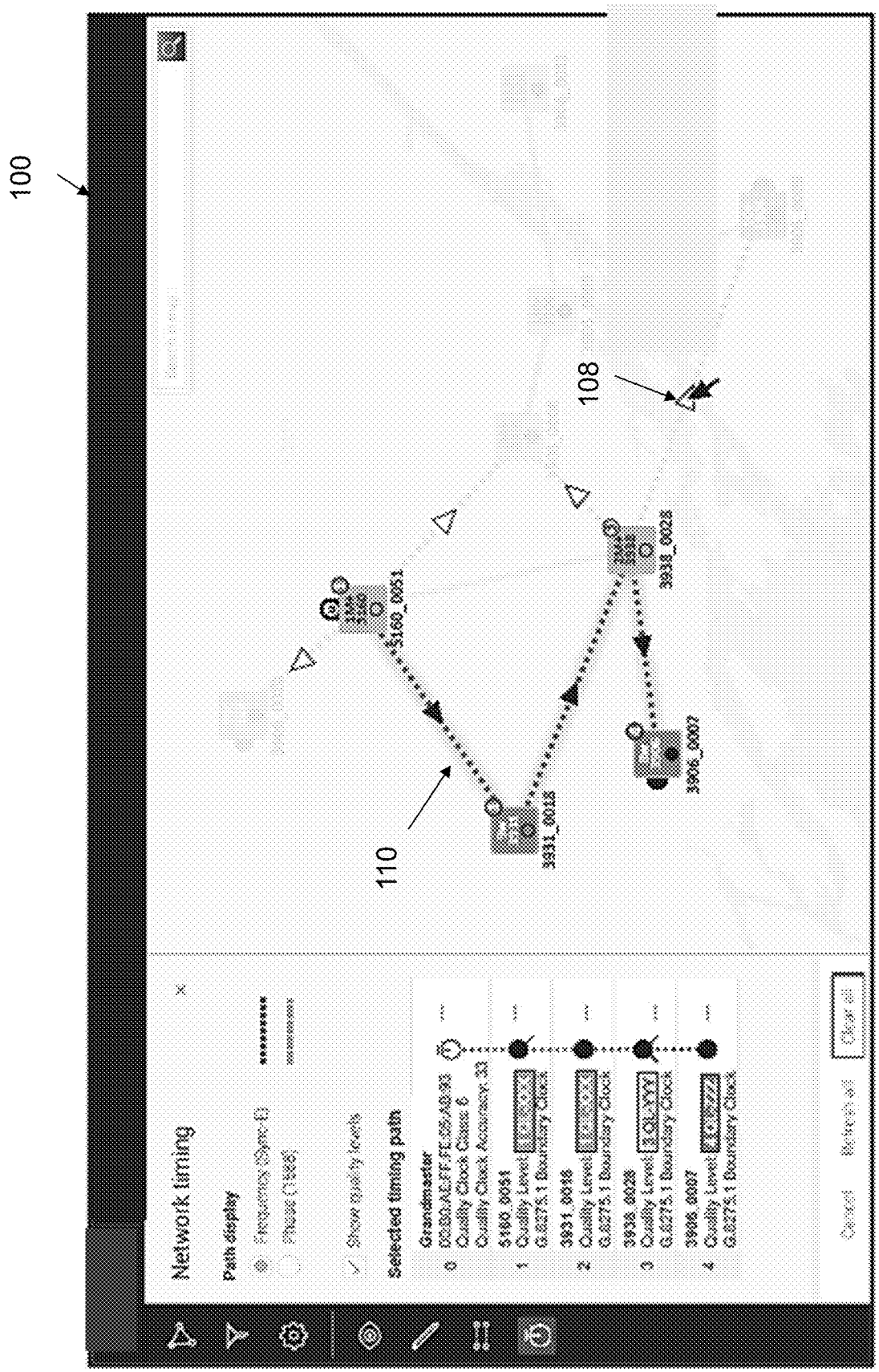
Figure 2F:
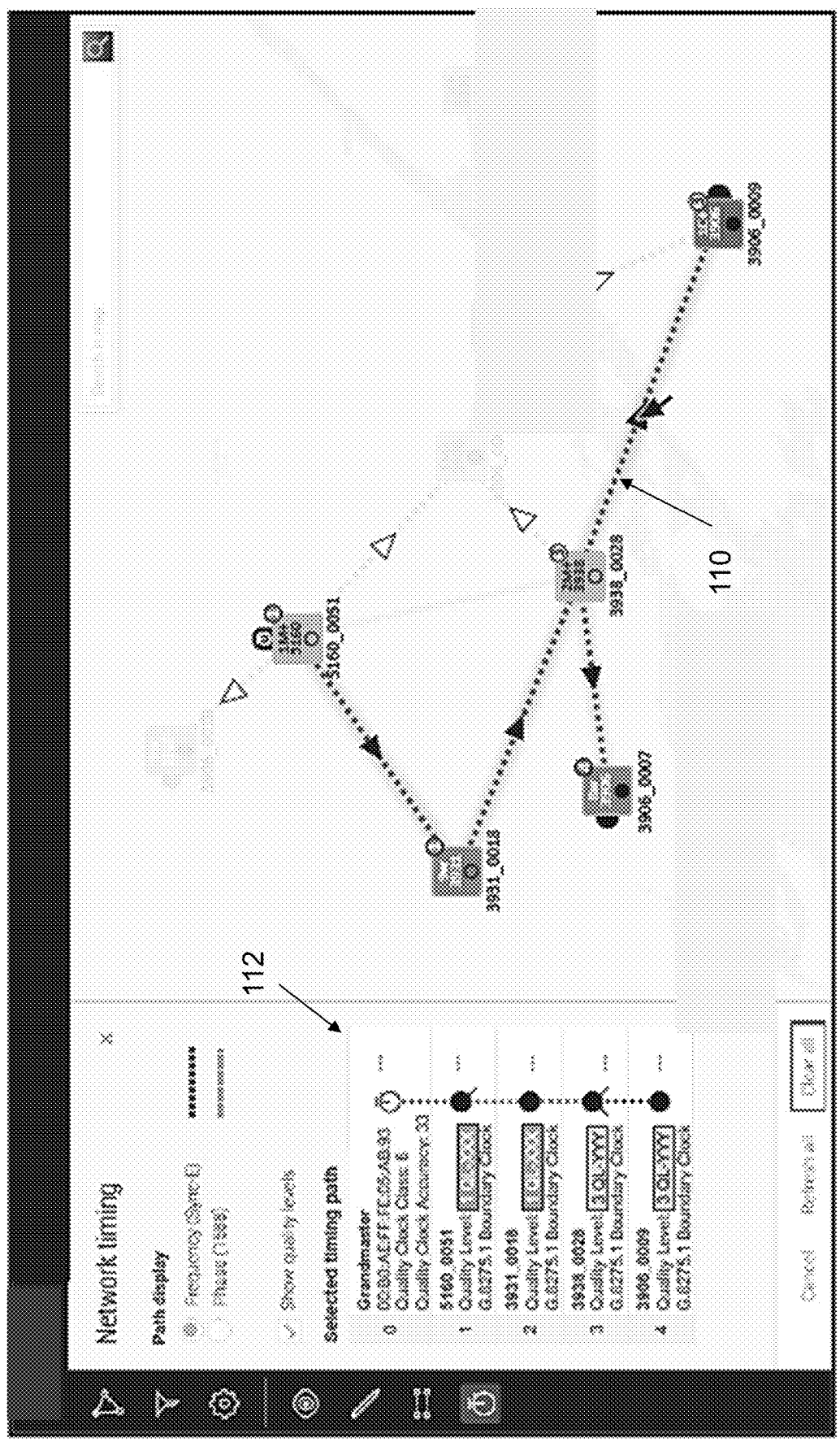

FIG. 2E and FIG. 2F show additional user interaction options with the GUI 100 of the present disclosure. Additional arrows 108 are shown along the dimmed paths which a user can select in order to expand the selected path 110 in other directions. This path expansion is detailed in FIG. 2F. when the path 110 is expanded and the section of the path is selected, the selected portion of the path 110 is highlighted in a color (e.g., blue) while the other portions of the path 110 are highlighted in grey. All other portions of the map remain dimmed. The drawer panel 112 updates to show the selected timing path 110.

Figure 2G:
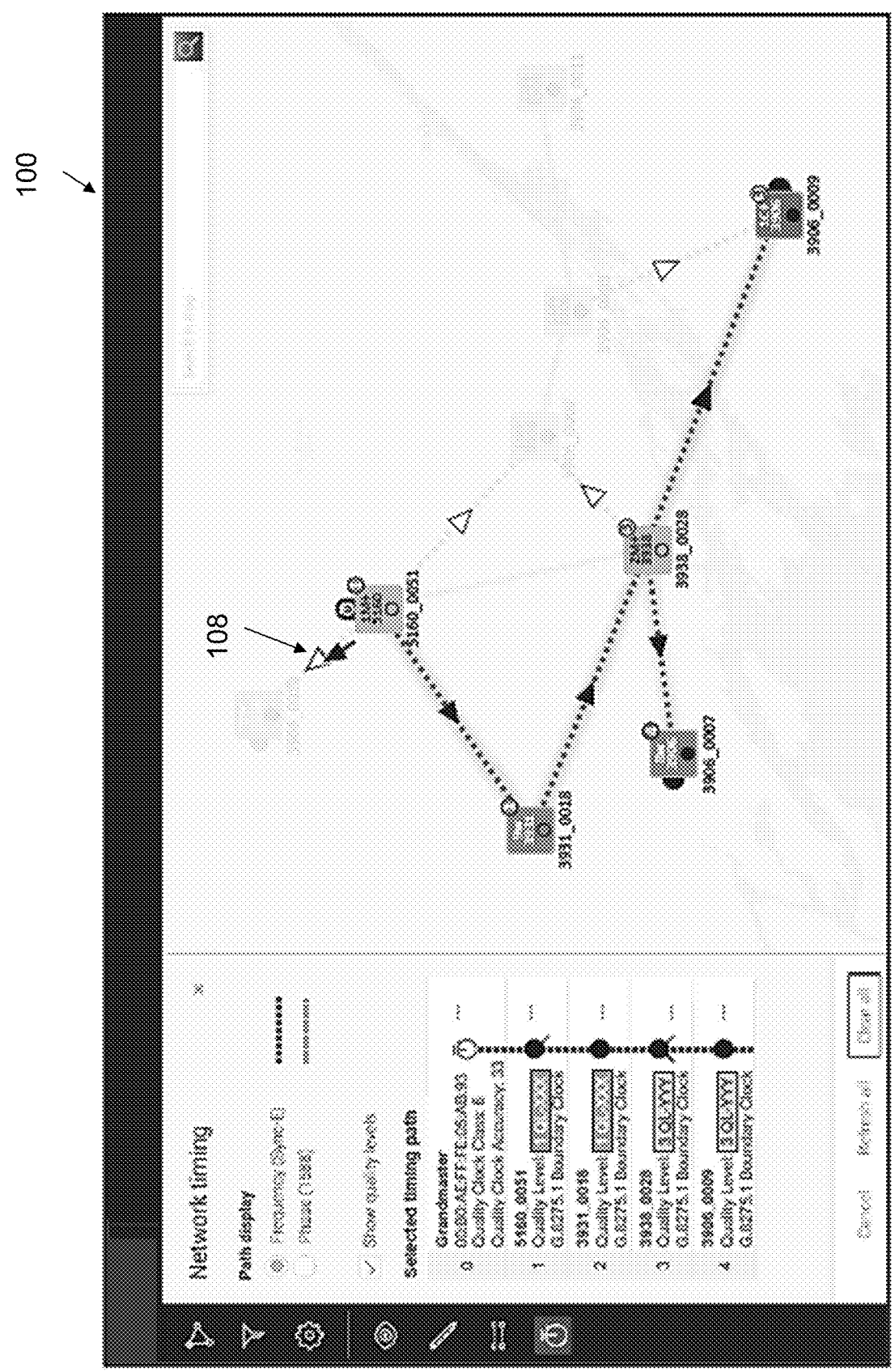
Figure 2F:
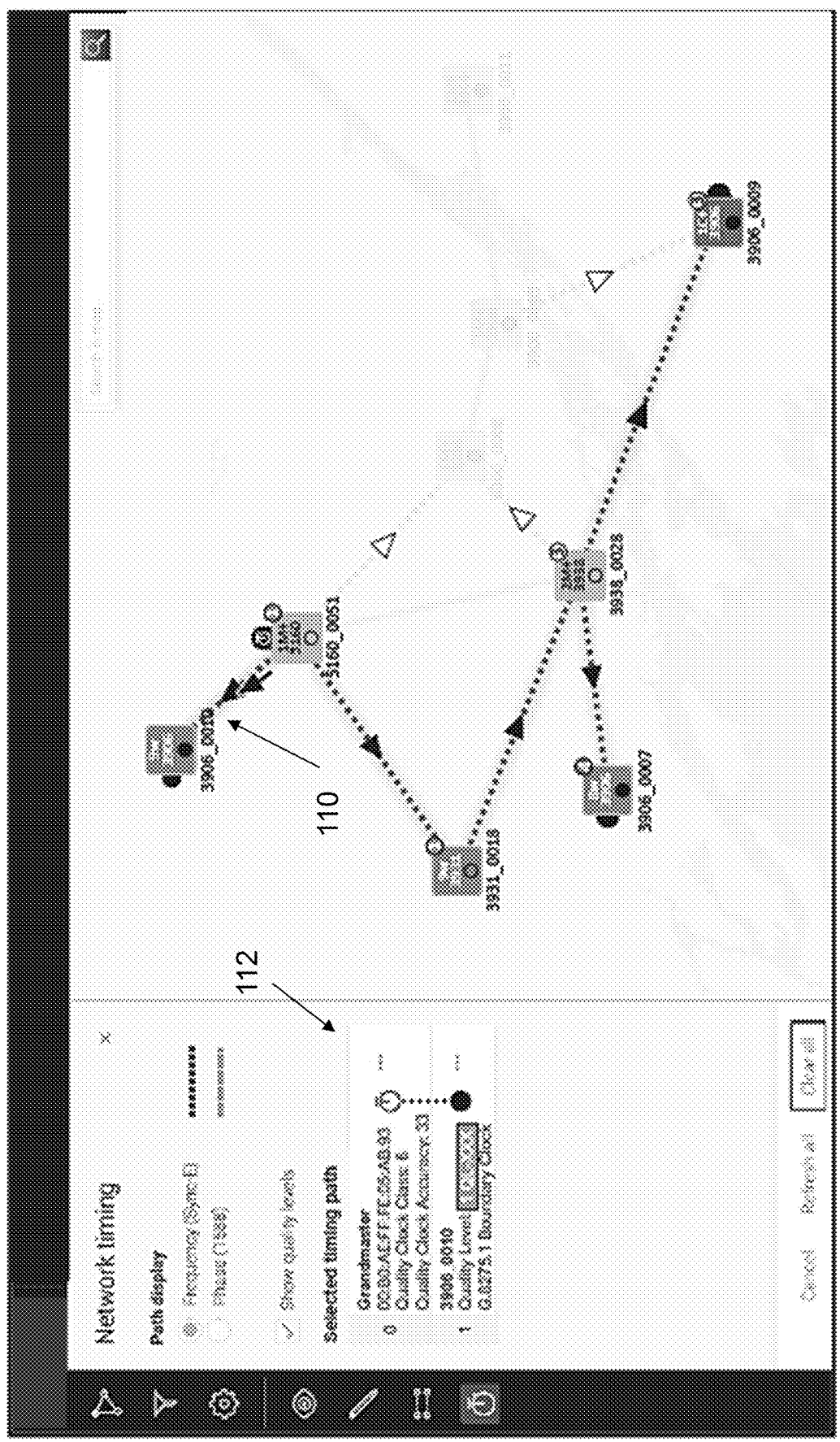
Figure 3A:
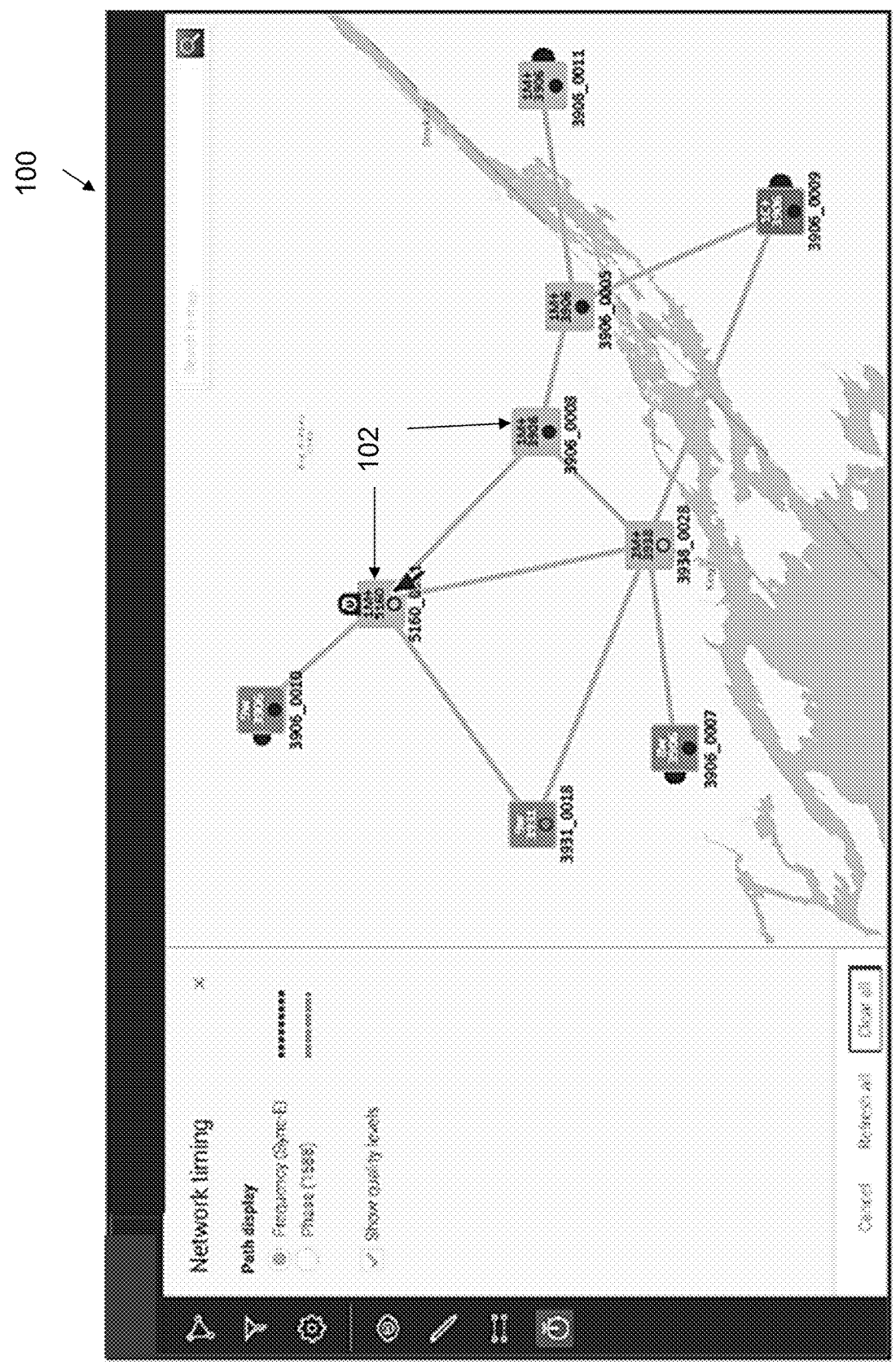
FIG. 3 includes screenshots (FIG. 3A-3G) which show a use case of the network timing trail interface of the present disclosure.
Figure 3B:
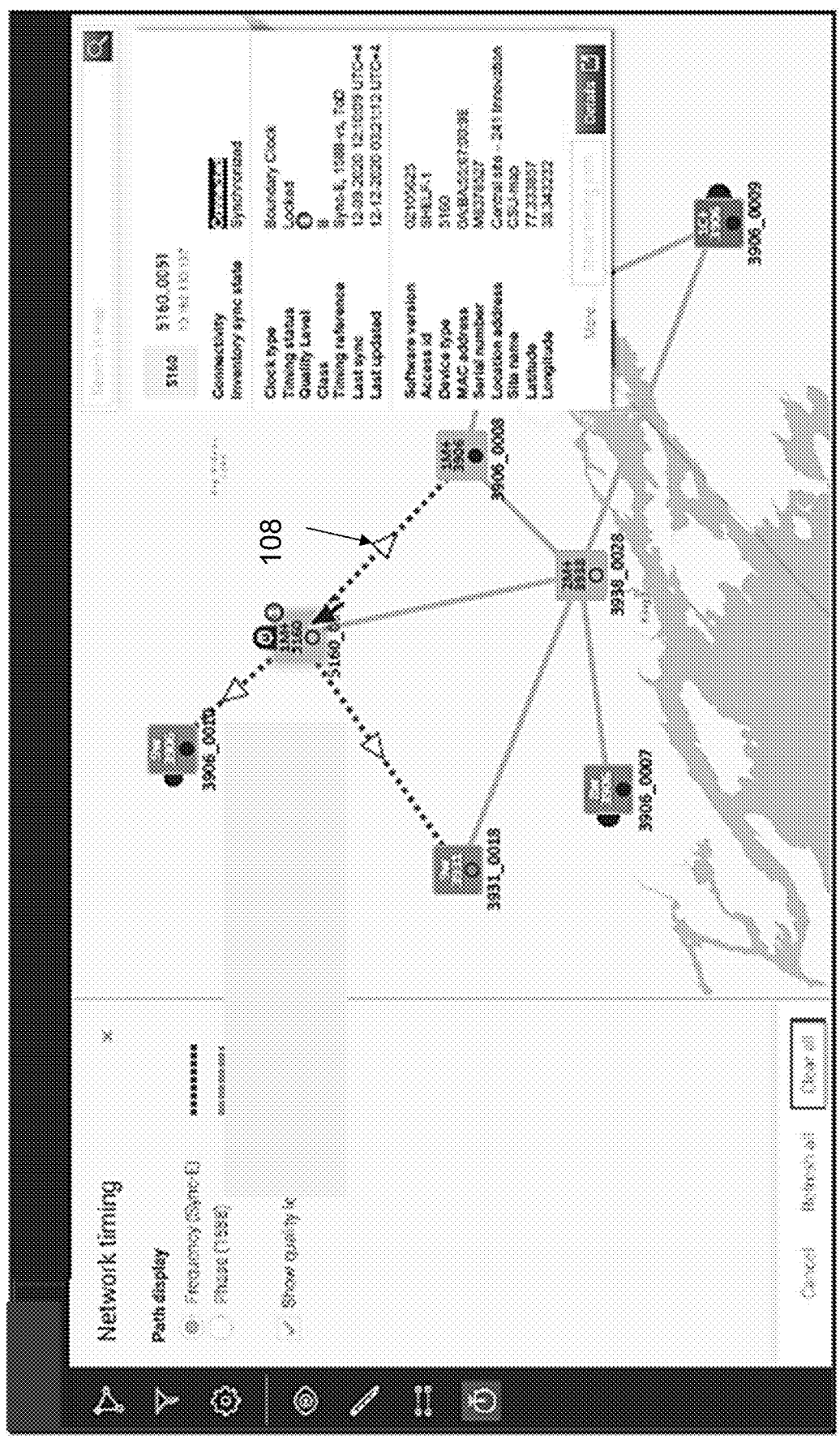
Figure 3C:
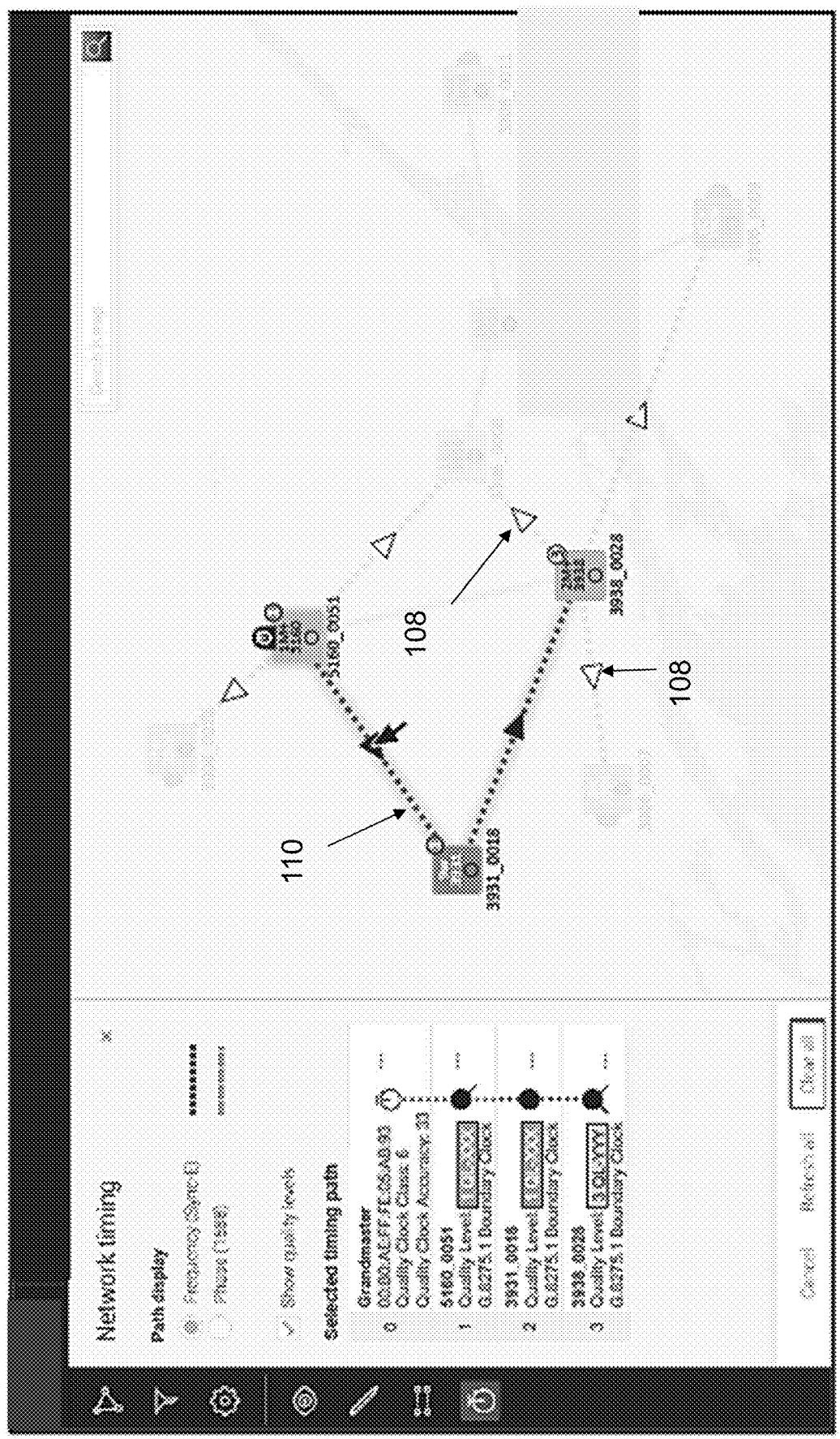
Figure 3D:
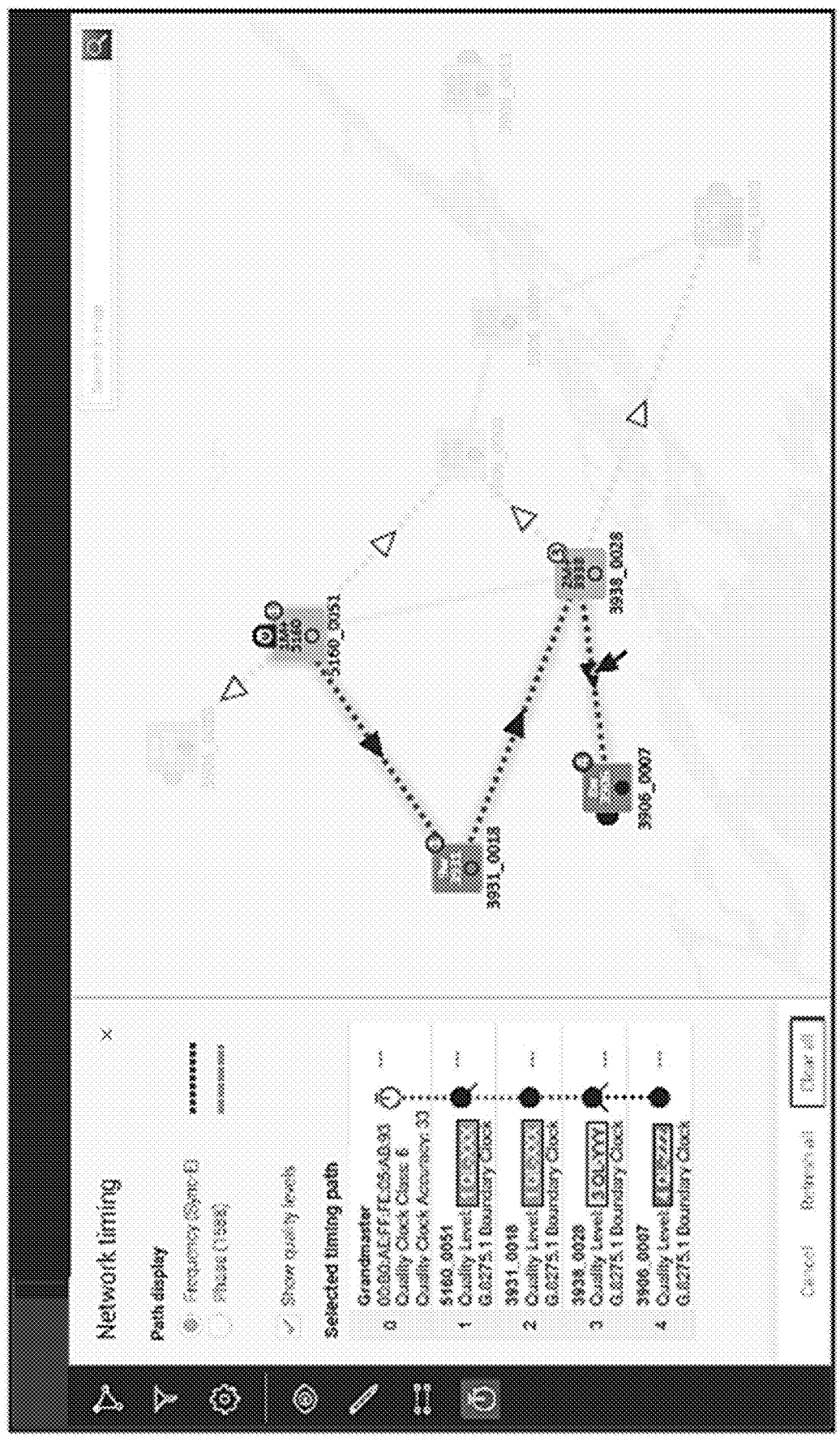
Figure 3E:
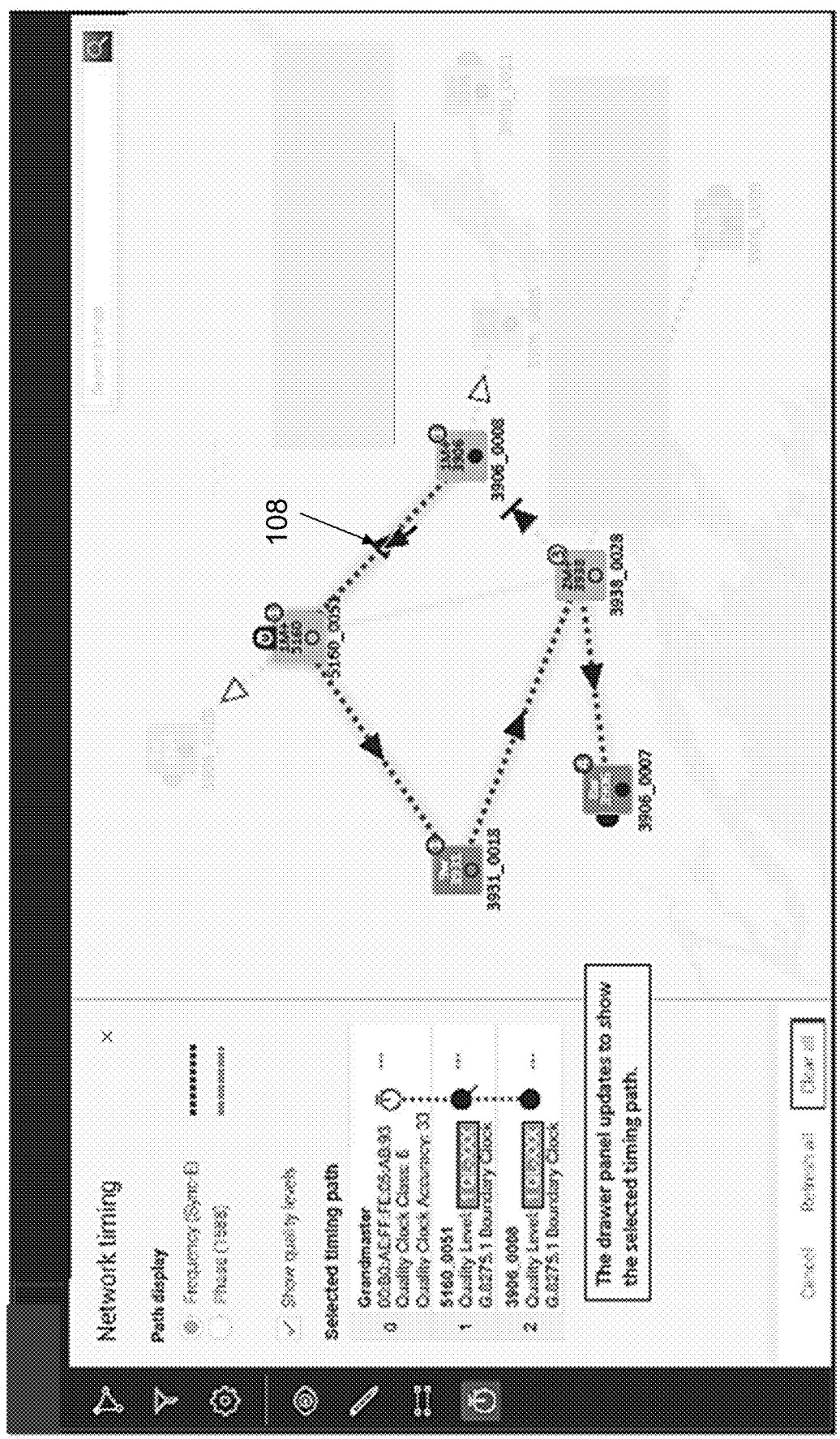
Figure 3F:
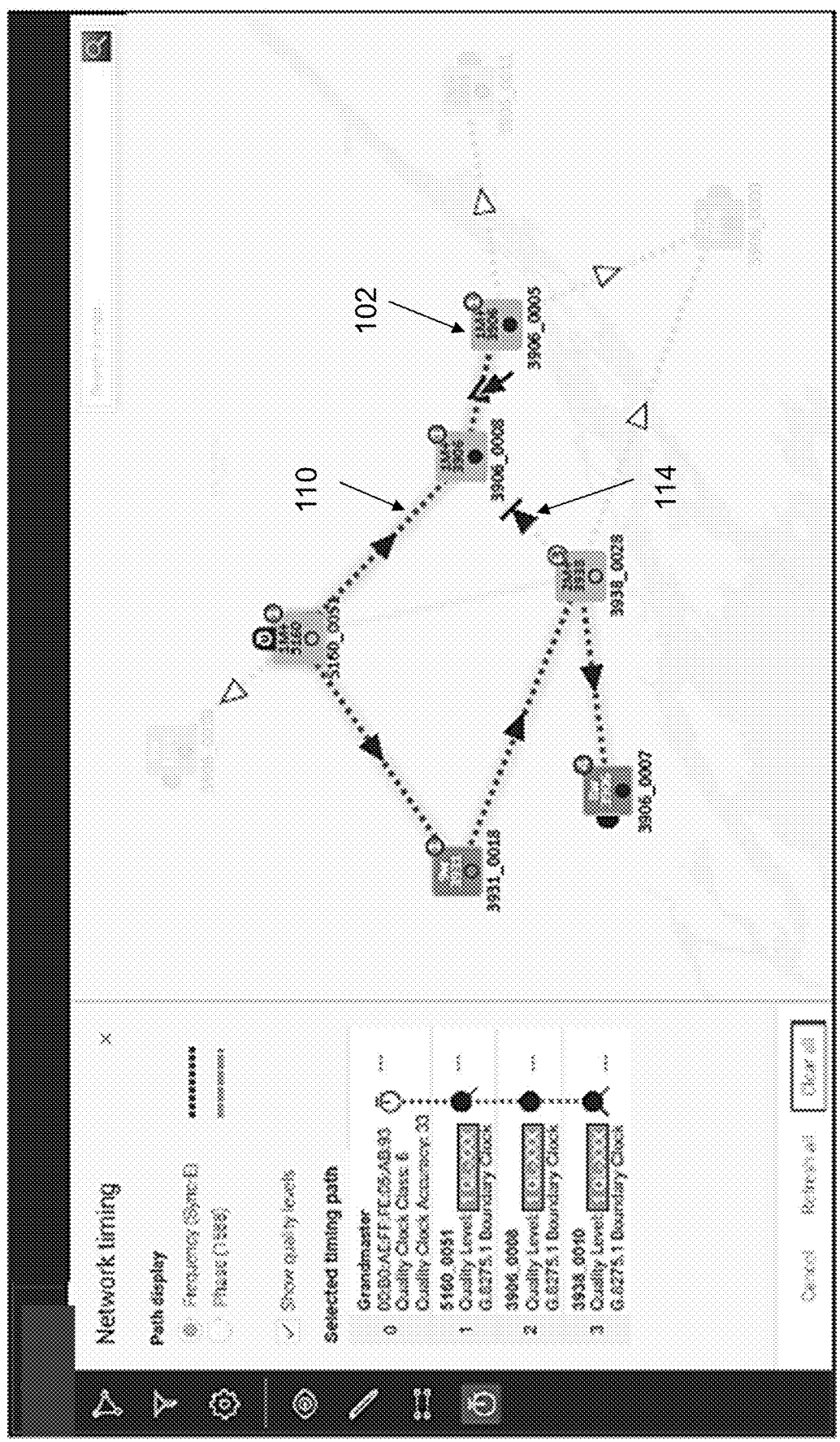
Figure 3G:
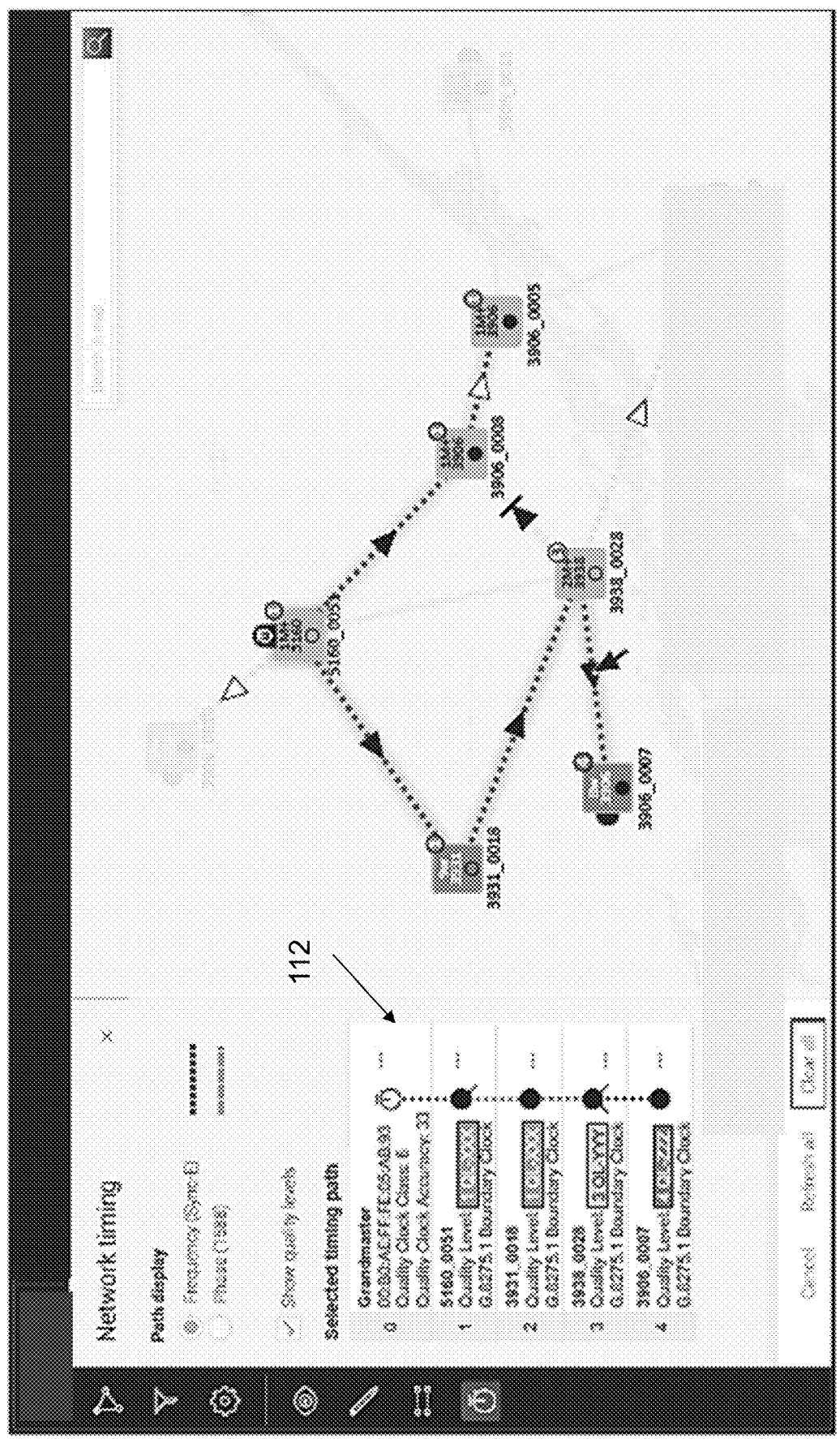
Figure 4A:
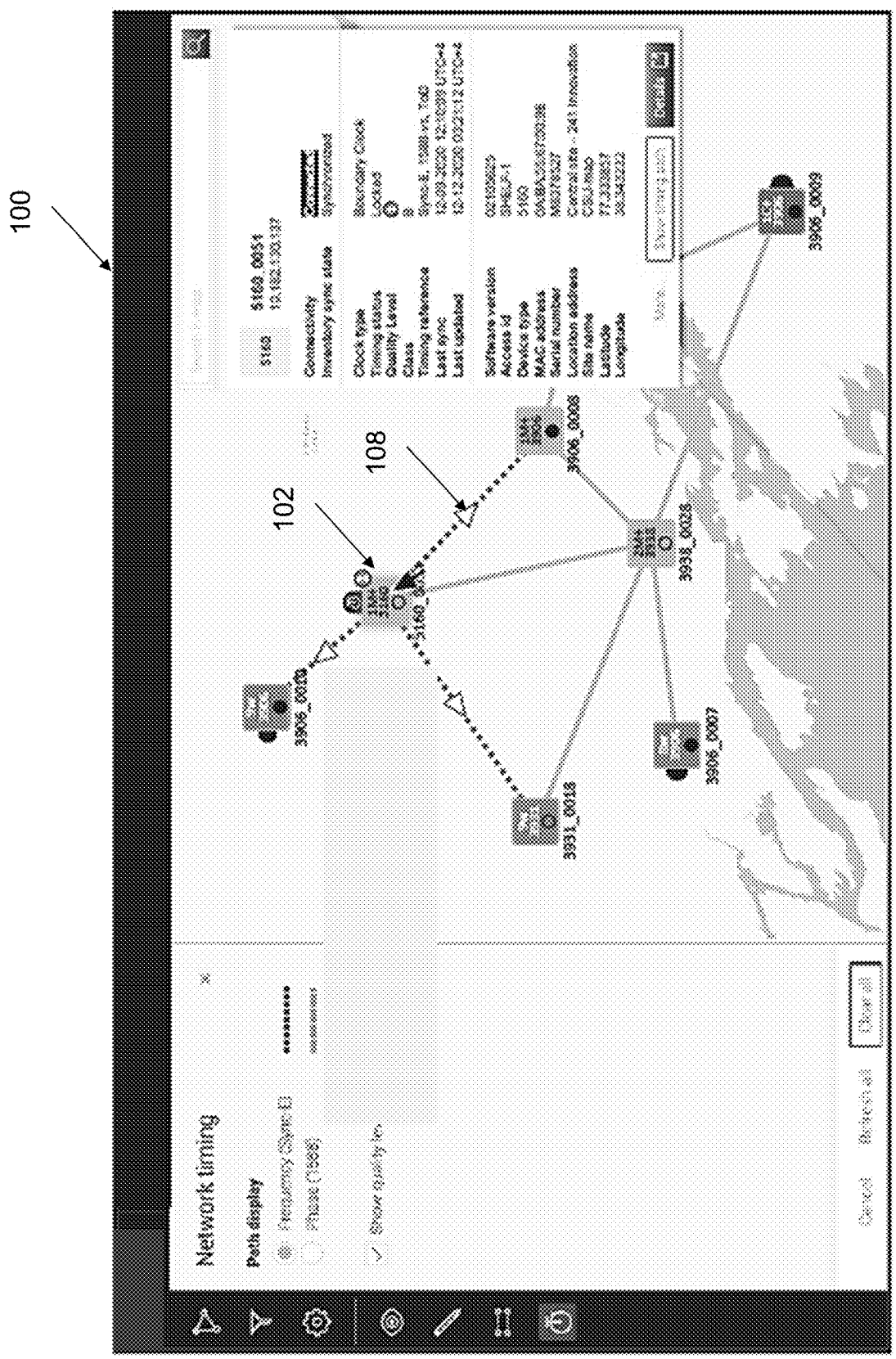
FIG. 4 includes screenshots (FIG. 4A-4D) which show a use case of the network timing trail interface of the present disclosure.
Figure 4B:
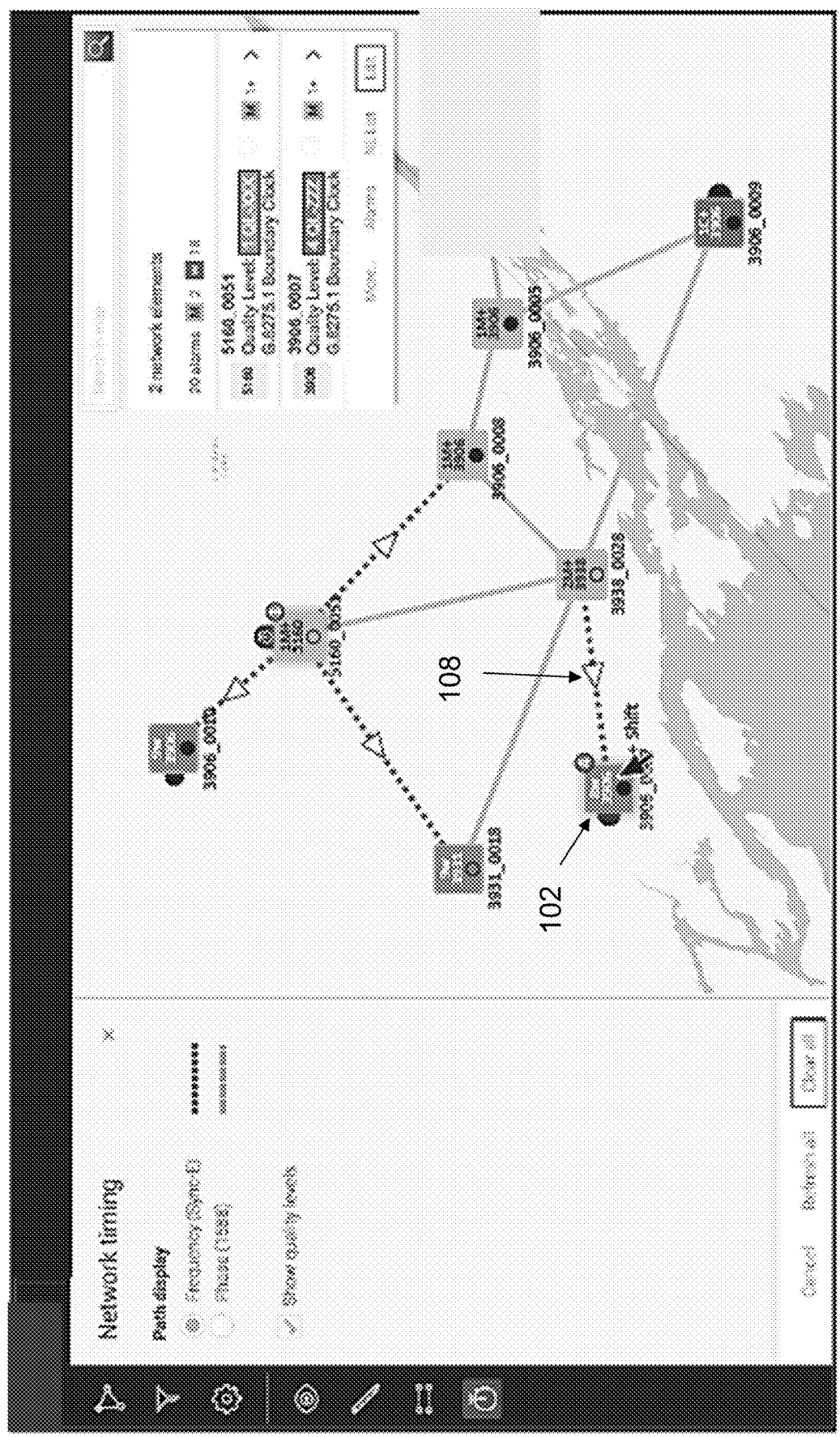
Figure 4C:
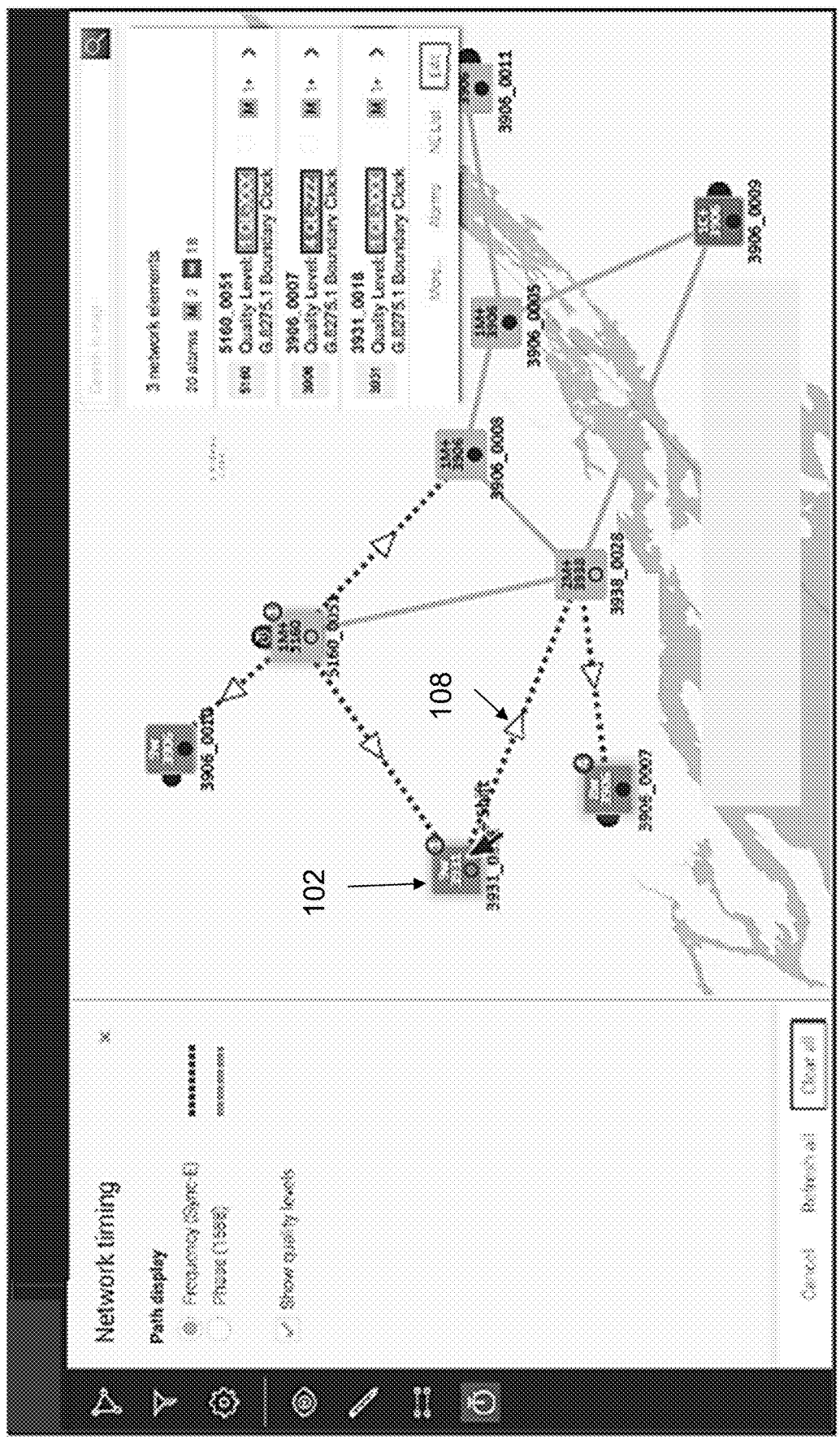
Figure 4D:
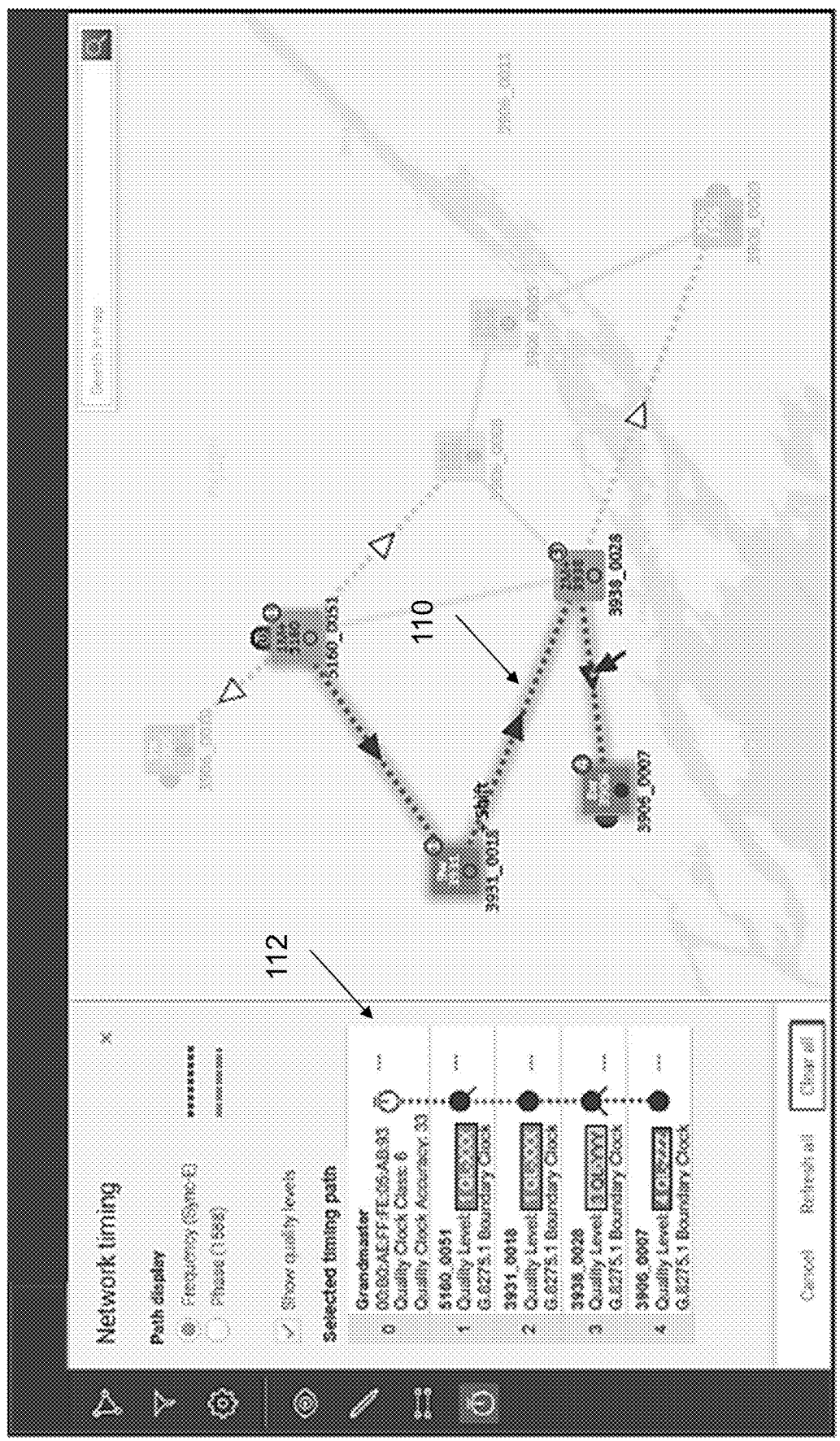

This path expansion and selection is again demonstrated in FIG. 2G and FIG. 2H. The arrow 108 is selected to expand the path 110 and show further NEs 102. After the arrow 108 is selected, the path 110 expands to highlight the NE which corresponds to that input/output arrow 108. As before, the drawer panel 112 is updated once the portion of path 110 is selected, only displaying the two NEs in the path 110. Once a portion of the map is selected with multiple branches of path 110 highlighted, different branches can be selected, where the desired highlighted sections are colored while the other highlighted portions are grey. The remaining portions of the GUI 100 map are again kept dimmed.

FIG. 3 includes screenshots (FIG. 3A-3G) which show a use case of the network timing trail GUI 100 of the present disclosure. The use case in FIG. 3 shows how a user can obtain the operational status of a Grandmaster (GM). In this case, a GM shows arrows 108 for all of its output paths represented in FIG. 3A. a user may click an arrow 108 to expand the path 110 in that direction. Other arrows will remain, so the user can follow them later if desired. In the case shown in FIG. 3C, the path will automatically continue to the next branching point, where the user can select further paths using the arrows 108 depicted in FIG. 3D. the user may decide to follow a different branch of the timing tree, by selecting another output arrow 108 from the GM shown in FIG. 3E and continued in FIG. 3F. as new branches are selected, new arrows 108 appear around the NEs 102 to show the next hop in the path 110. A blocked arrow 114 will appear when the output of an NE 102 is not being used as an input of another NE 102. Now that multiple branches are highlighted, the user is able to select a particular branch to be displayed in the drawer panel 112 depicted in FIG. 3G. Again, the selected branch will be highlighted in a color while the non-selected branch will be highlighted in grey, the remainder of the map will remain dimmed.

FIG. 4 includes screenshots (FIG. 4A-4D) which show a use case of the network timing trail GUI 100 of the present disclosure. The use case in FIG. 4 shows how a user can obtain the operational status of a subset of NEs 102. A user selects a first NE 102 in FIG. 4A and a plurality of arrows 108 appear for the selected NE 102. The user selects an additional NE 102 in FIG. 4B and additional arrows 102 appear for the second selected NE 102. In FIG. 4C, the user selects another NE 102 and arrows 108 appear for the third selected NE 102. The user can select any of the plurality of arrows 108 to show the active clock path for the respective NE 102. This is shown in FIG. 4D, where the drawer panel 112 appears when the arrow 108 is selected, highlighting the path 110.

FIG. 5 includes screenshots (FIG. 5A-5N) which show a use case of the network timing trail GUI 100 of the present disclosure. FIG. 5A shows an initial MCP network map view with a plurality of NEs 102 displayed. In FIG. 5B, when a user hovers over an NE 102 with a cursor or other interaction method of the like, a legend popup 118 will appear. When the NE 102 is selected, a detail pod 104 will appear, providing additional information for the NE 102 shown in FIG. 5C. once an NE 102 is selected, the user may select the trace timing source button 120 to show the timing path 110 from the selected NE 102 back to its source, shown in FIG. 5D. When the timing path 110 is highlighted, the timing path 110 will be additionally shown in the drawer panel 112 and the remainder of the map will become dimmed for easier viewing. Additionally, the user may utilize the clear all button 122 to clear all selections on the map and start over.

FIG. 5E again shows an initial network map view with an NE 102 selected, this NE being the Grandmaster (GM). The user may then select the trace timing tree button 124 to display the timing path arrows 108 for the selected NE 102, shown in FIG. 5F. This again dims the remainder of the map.

The arrows 108 point to selectable NEs 102 which are related to the path of the first NE 102 (the GM). When an additional NE 102 is selected in FIG. 5G, additional arrows 108 appear, showing where the next branching point may be. This may be repeated until the user has selected all of the NEs 102 they wish to inspect. This is shown through FIG. 5M. The user may also select the plus button 126, shown in FIG. 5I, in the lower corner of an NE 102 to further expand the arrows 108 and view possible paths 110.

Figure 5A:
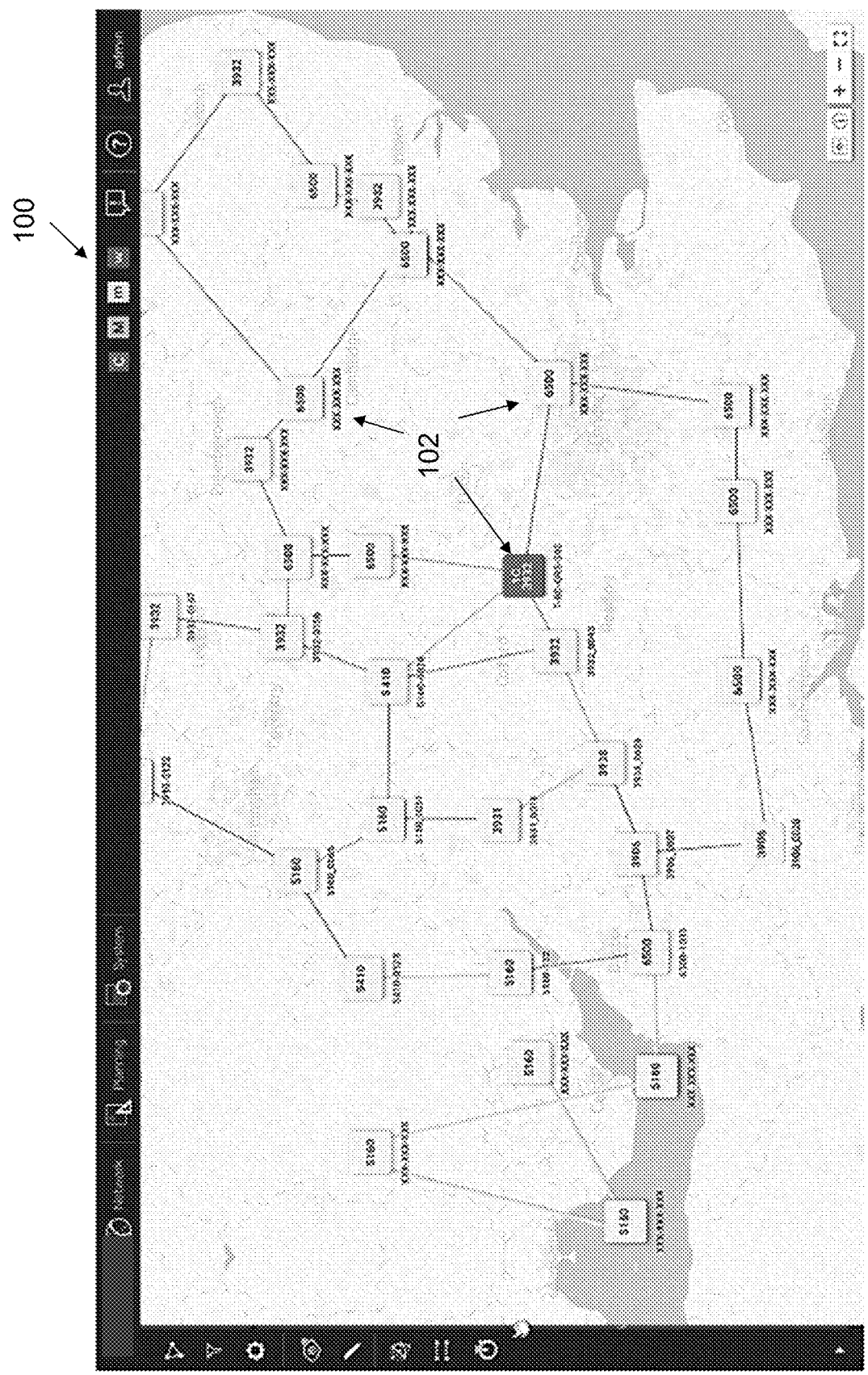
FIG. 5 includes screenshots (FIG. 5A-5N) which show a use case of the network timing trail interface of the present disclosure.
Figure 5B:
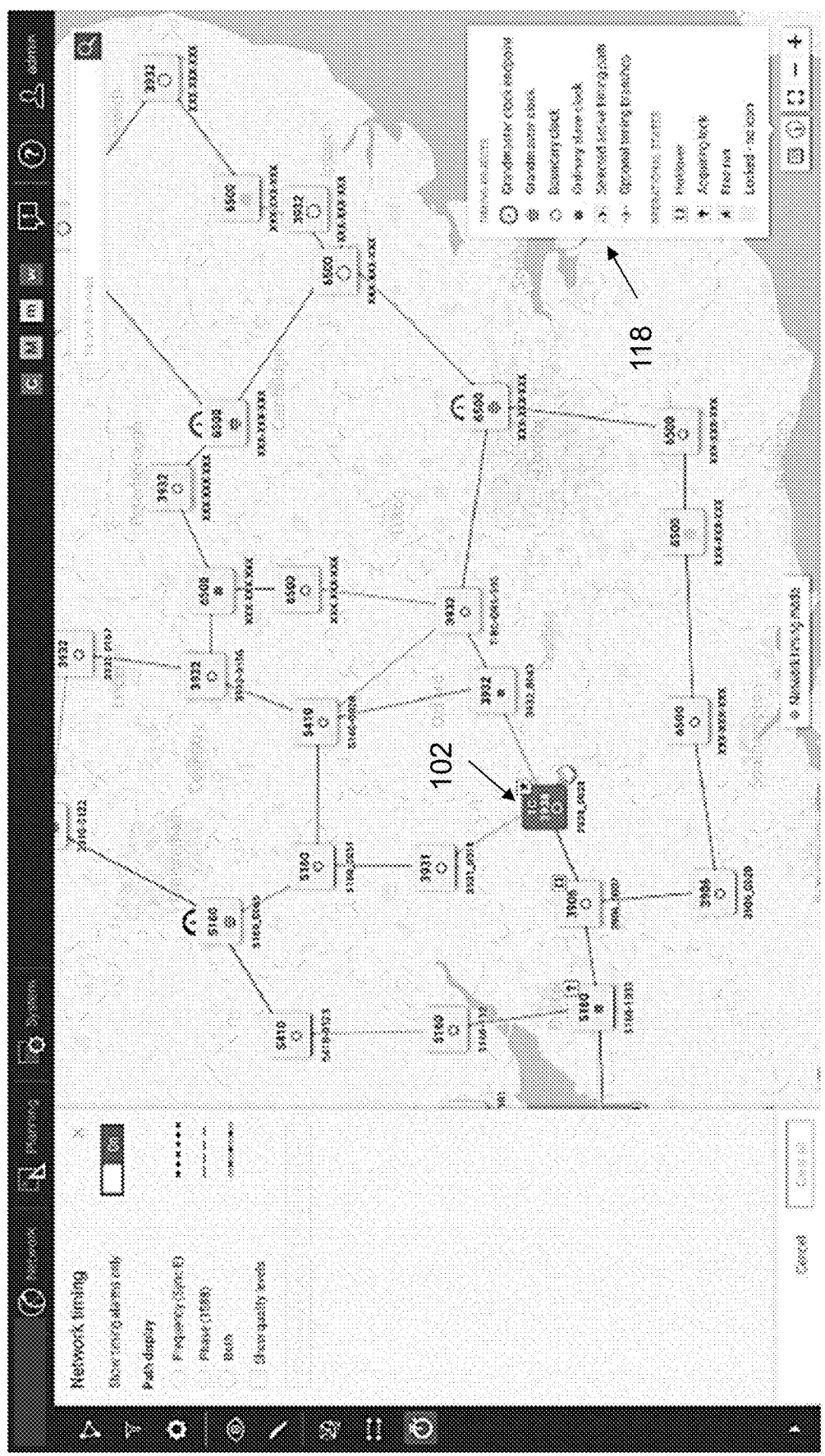
Figure 5C:
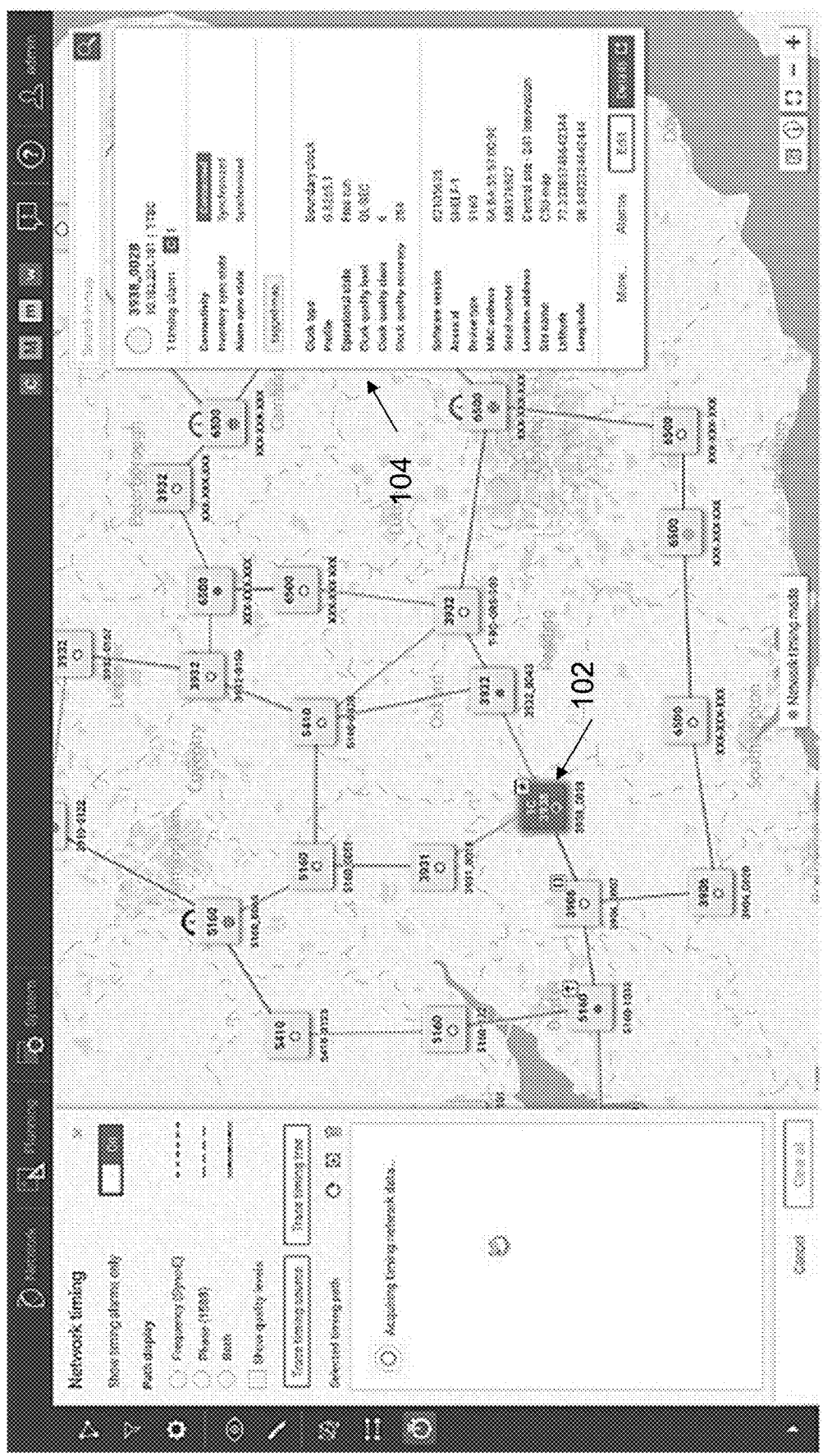
Figure 5D:
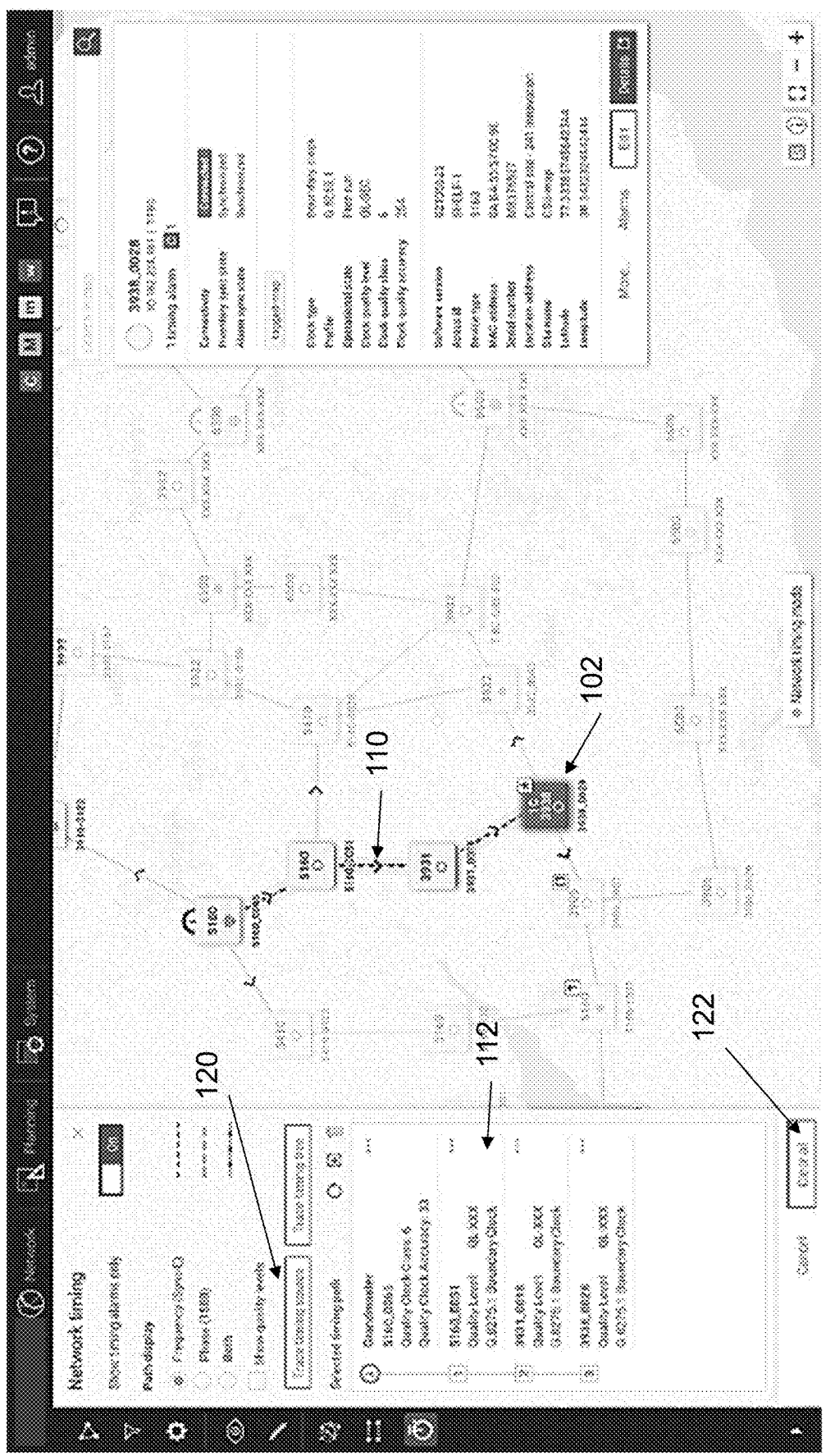
Figure 5E:
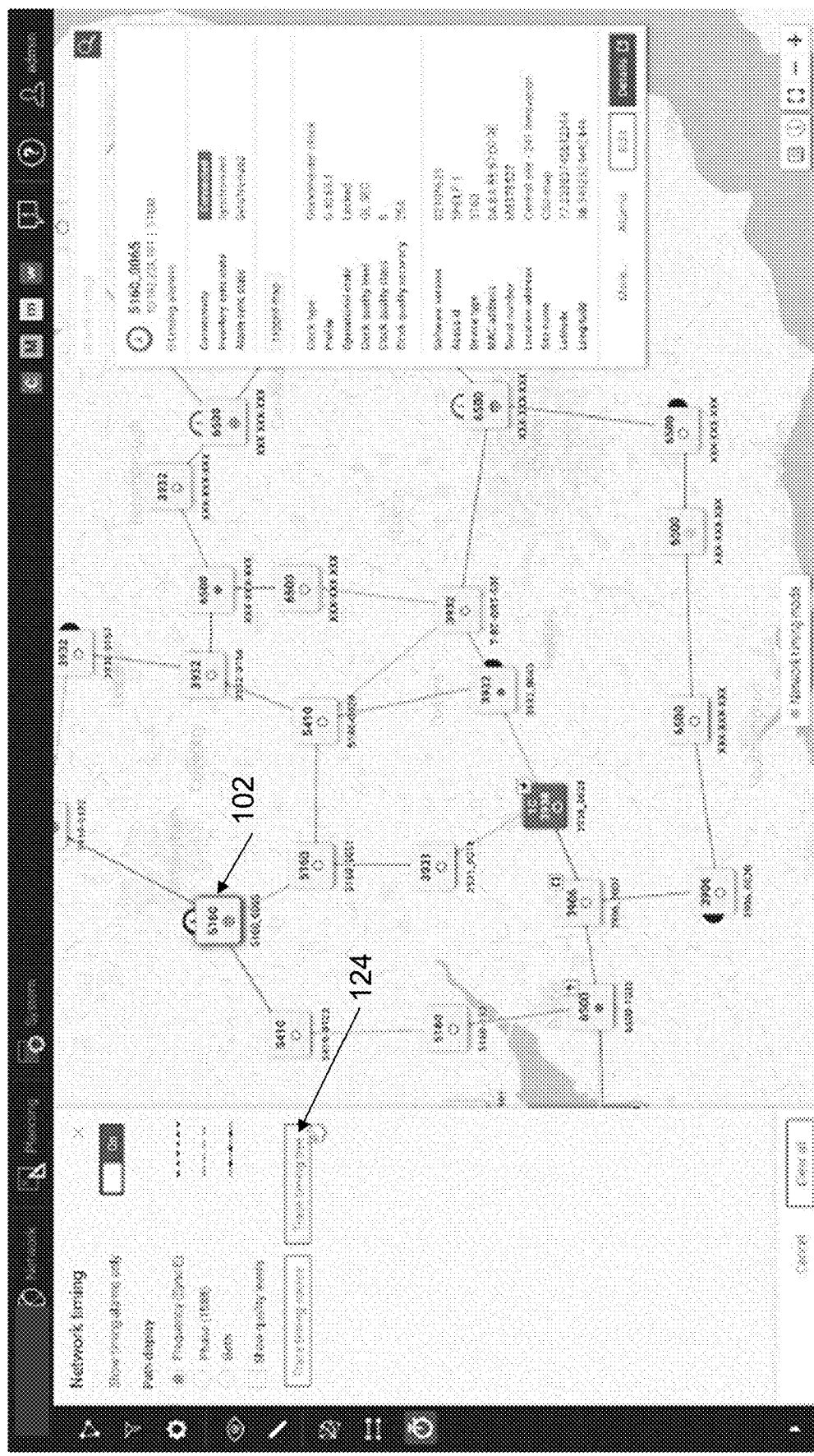
Figure 5F:
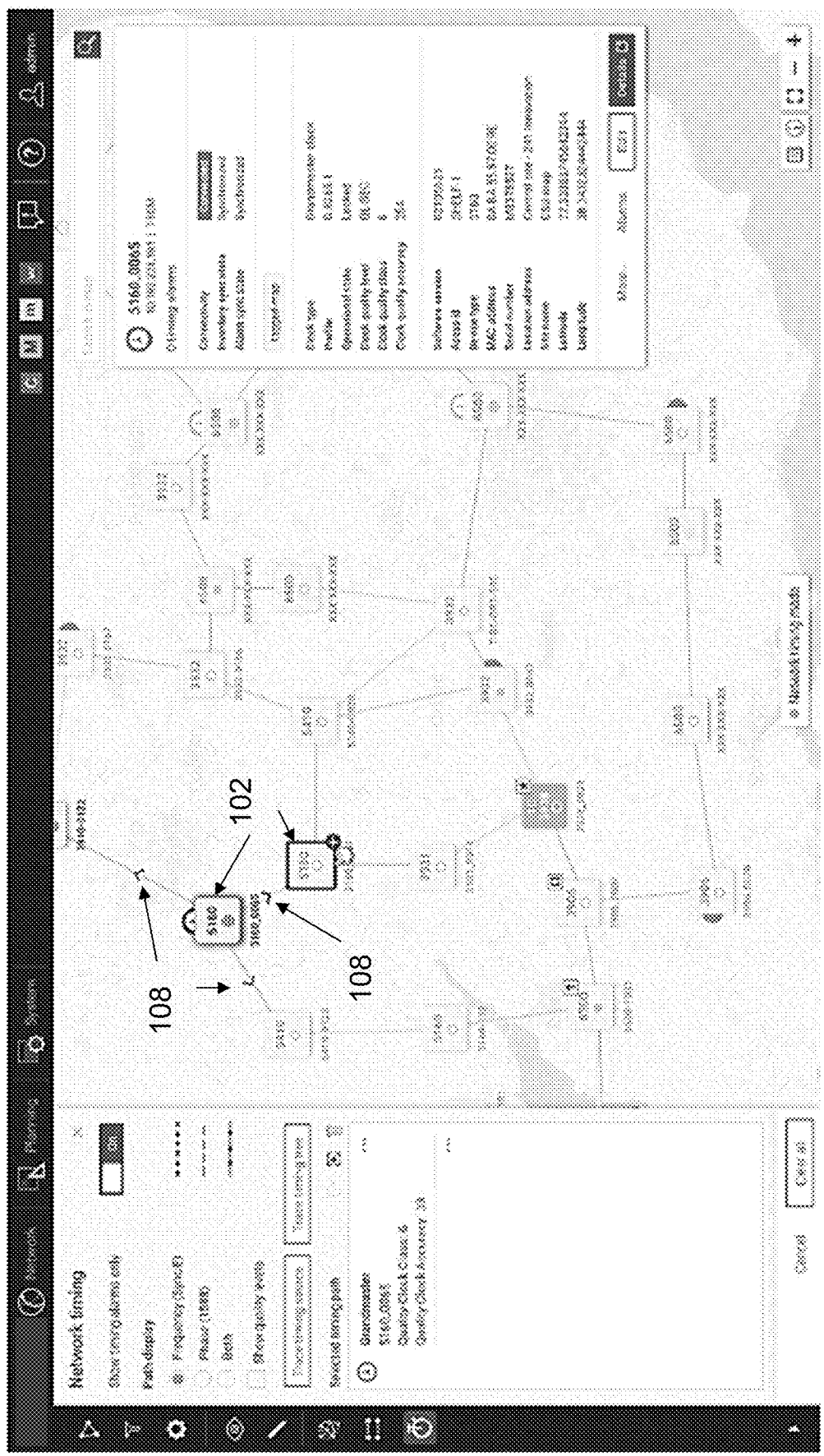
Figure 5G:
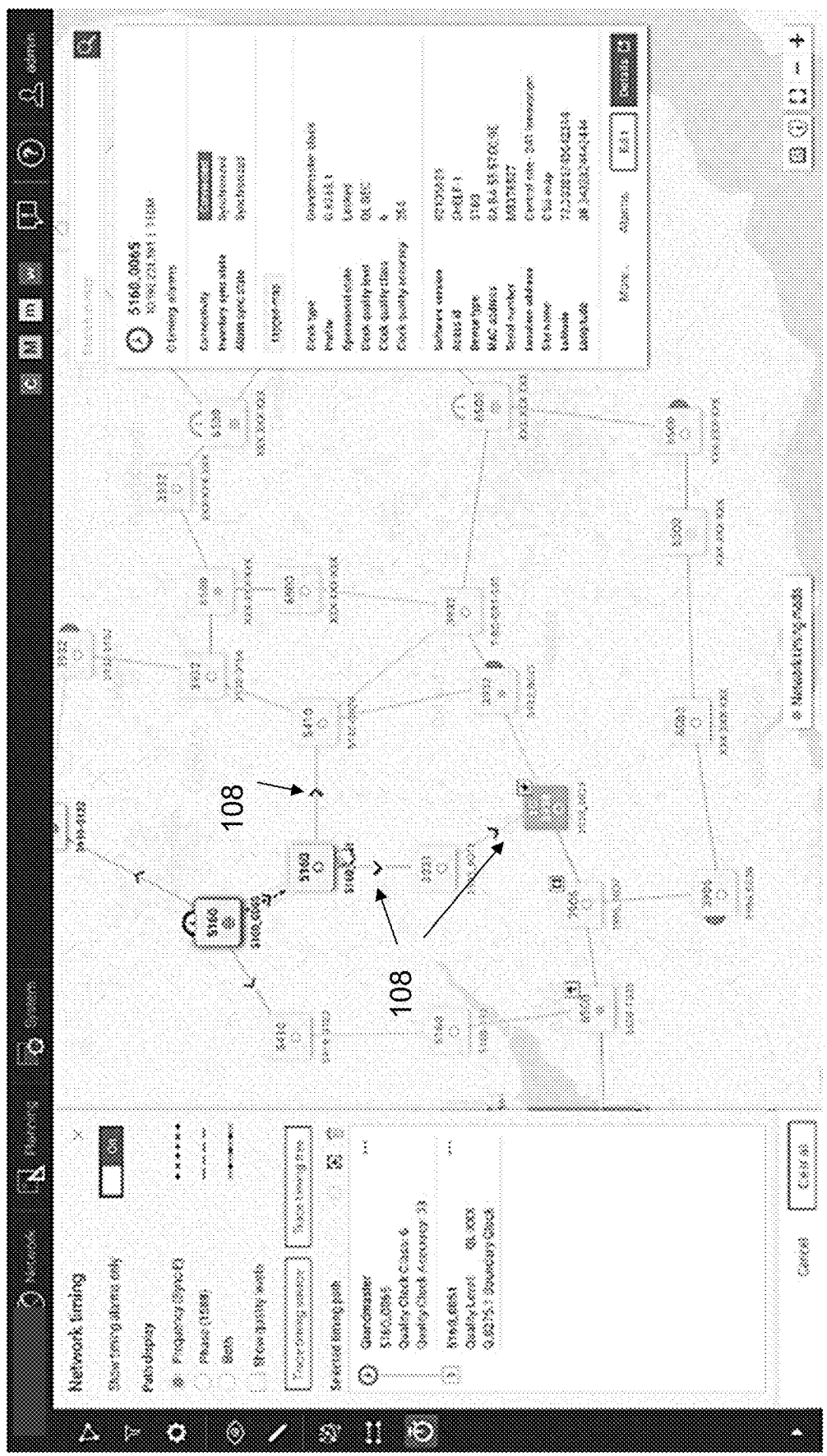
Figure 5H:
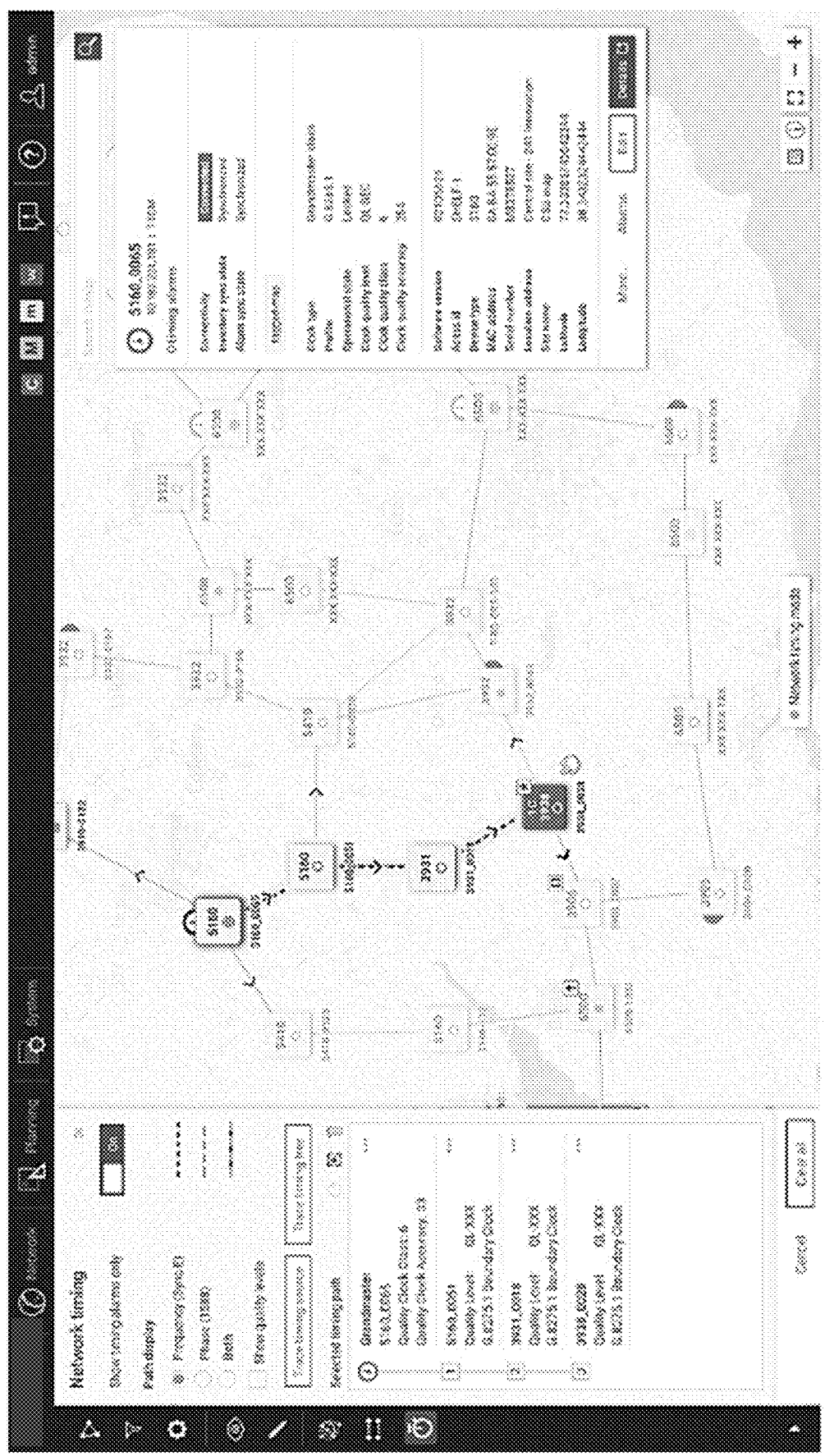
Figure 5I:
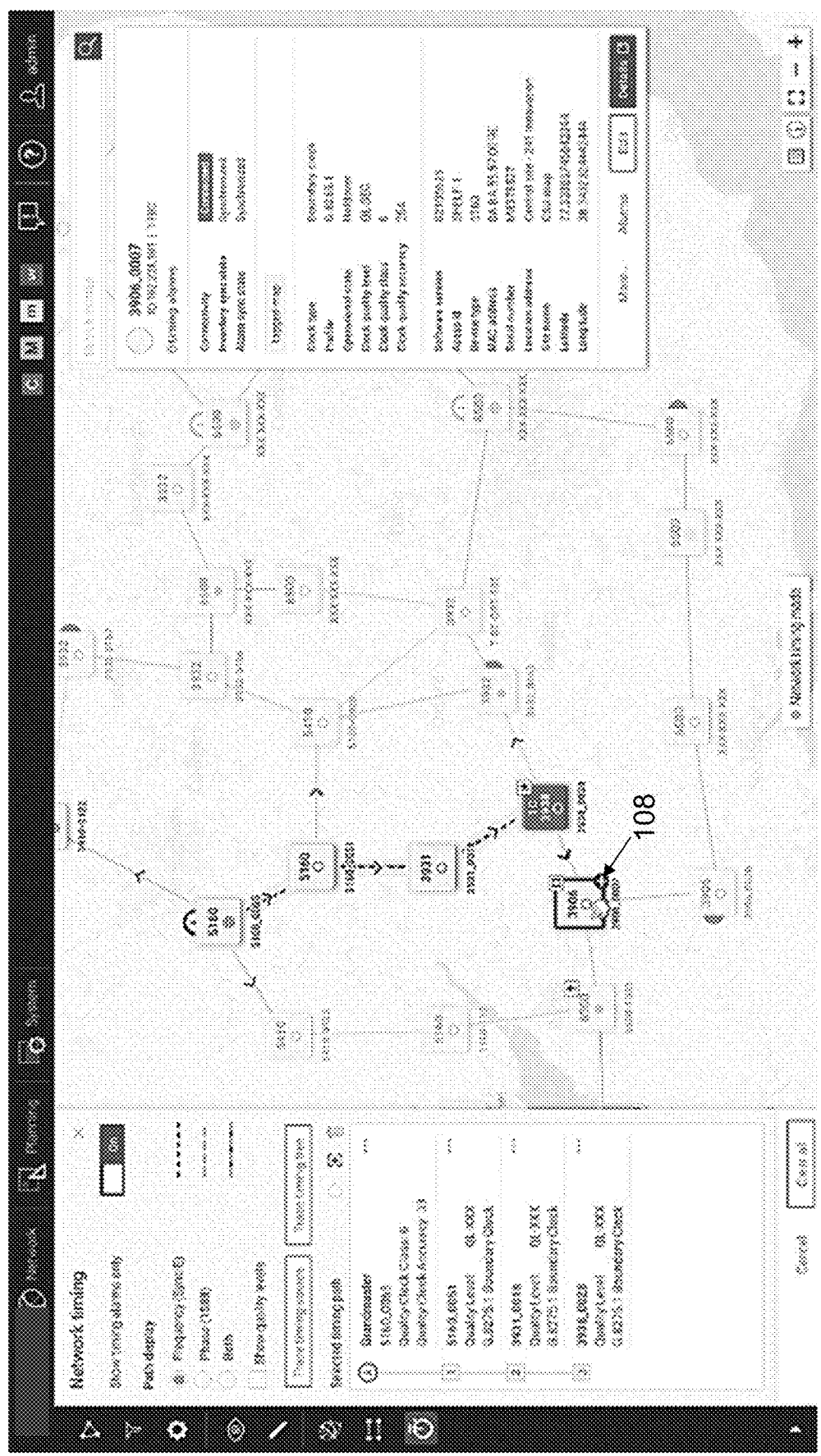
Figure 5J:
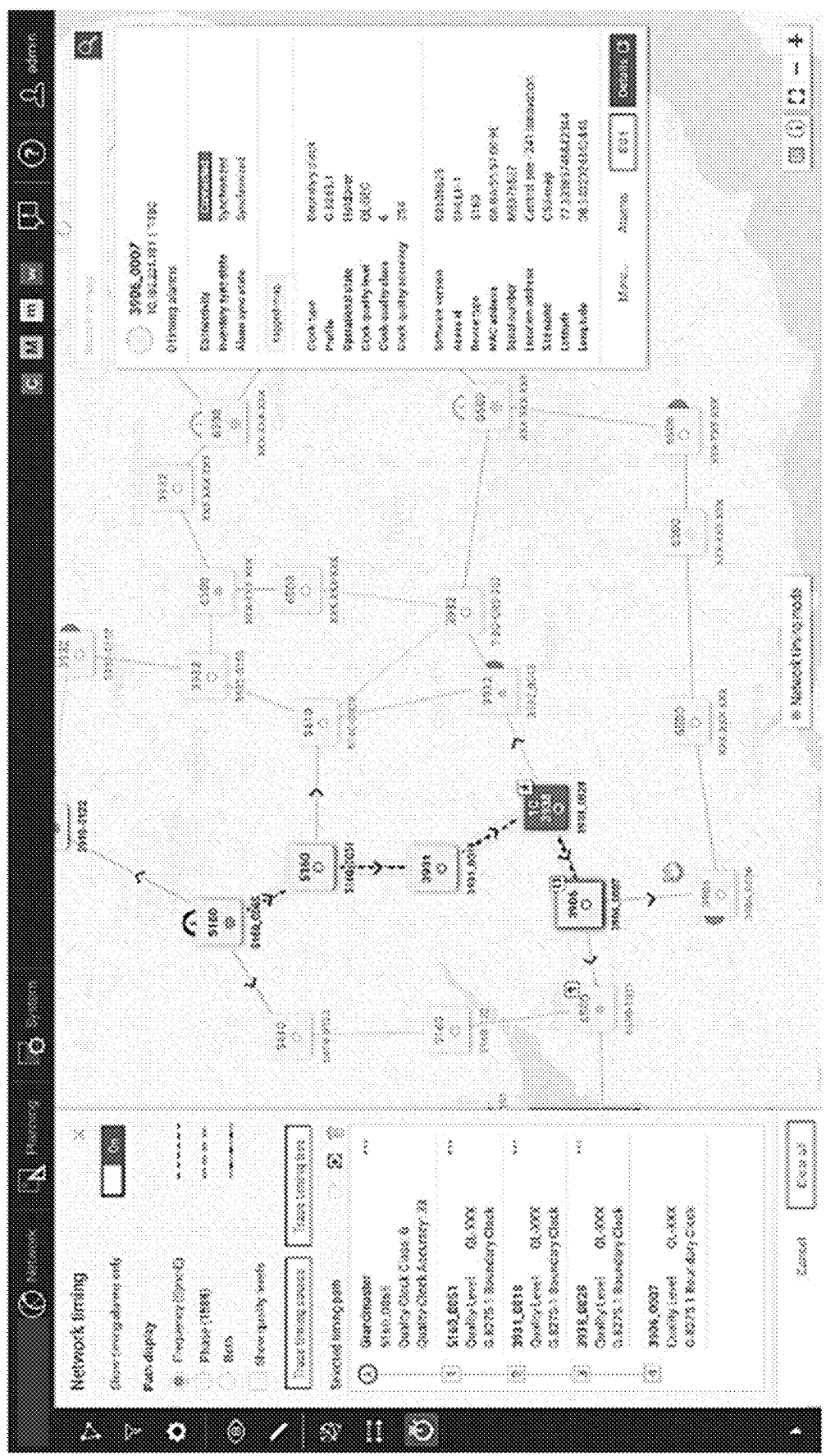
Figure 5K:
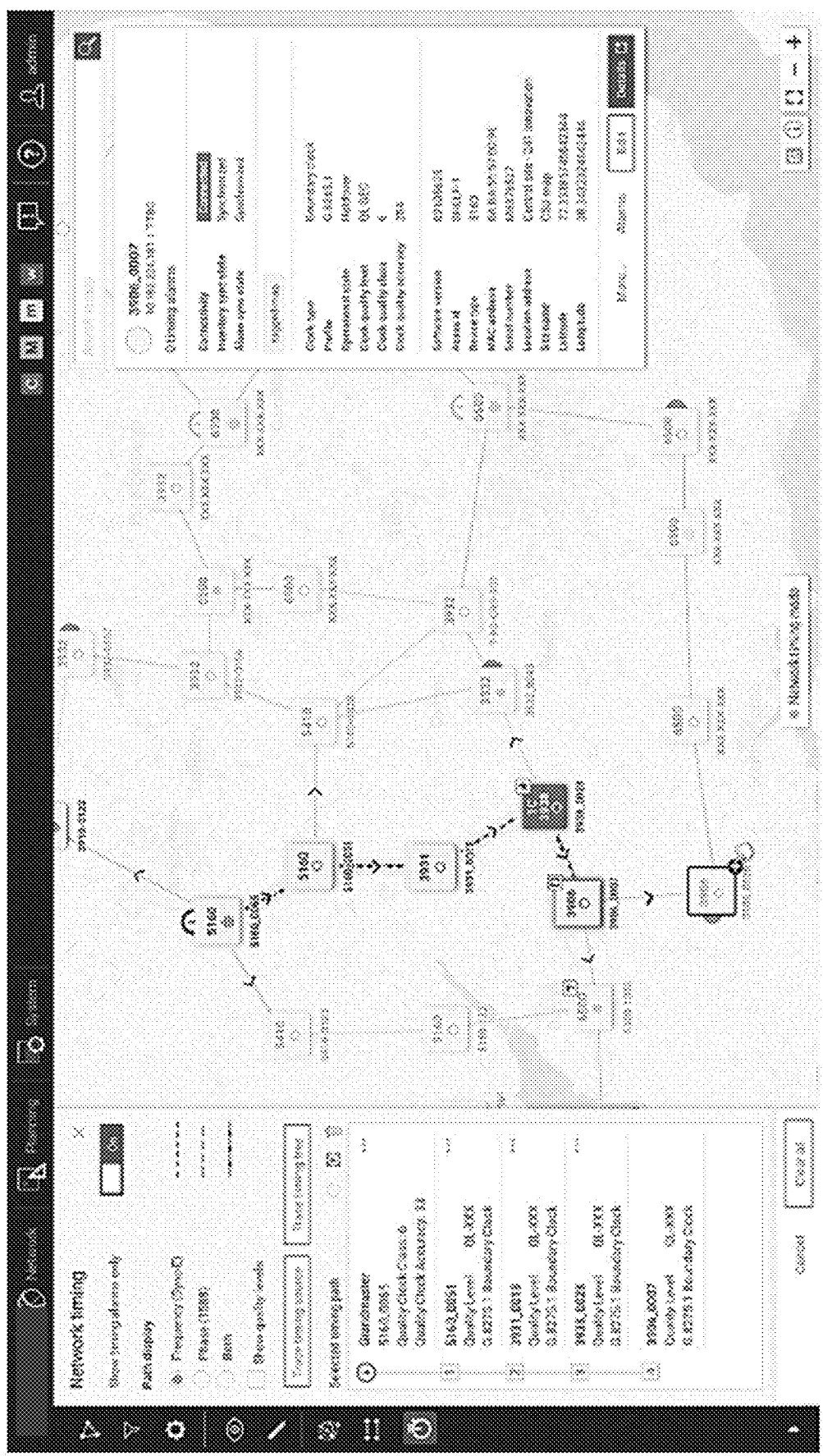
Figure 5L:
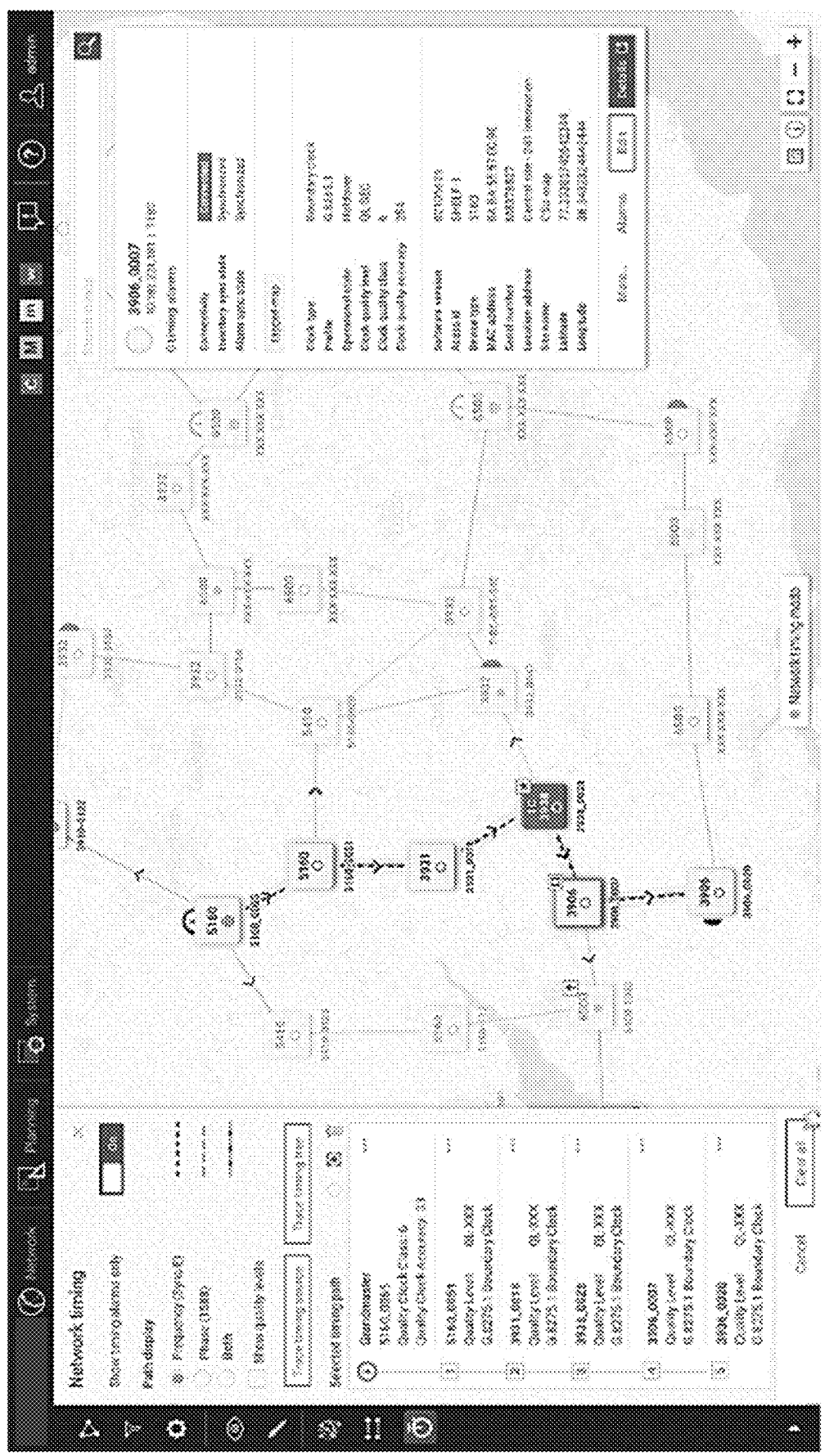
Figure 5M:
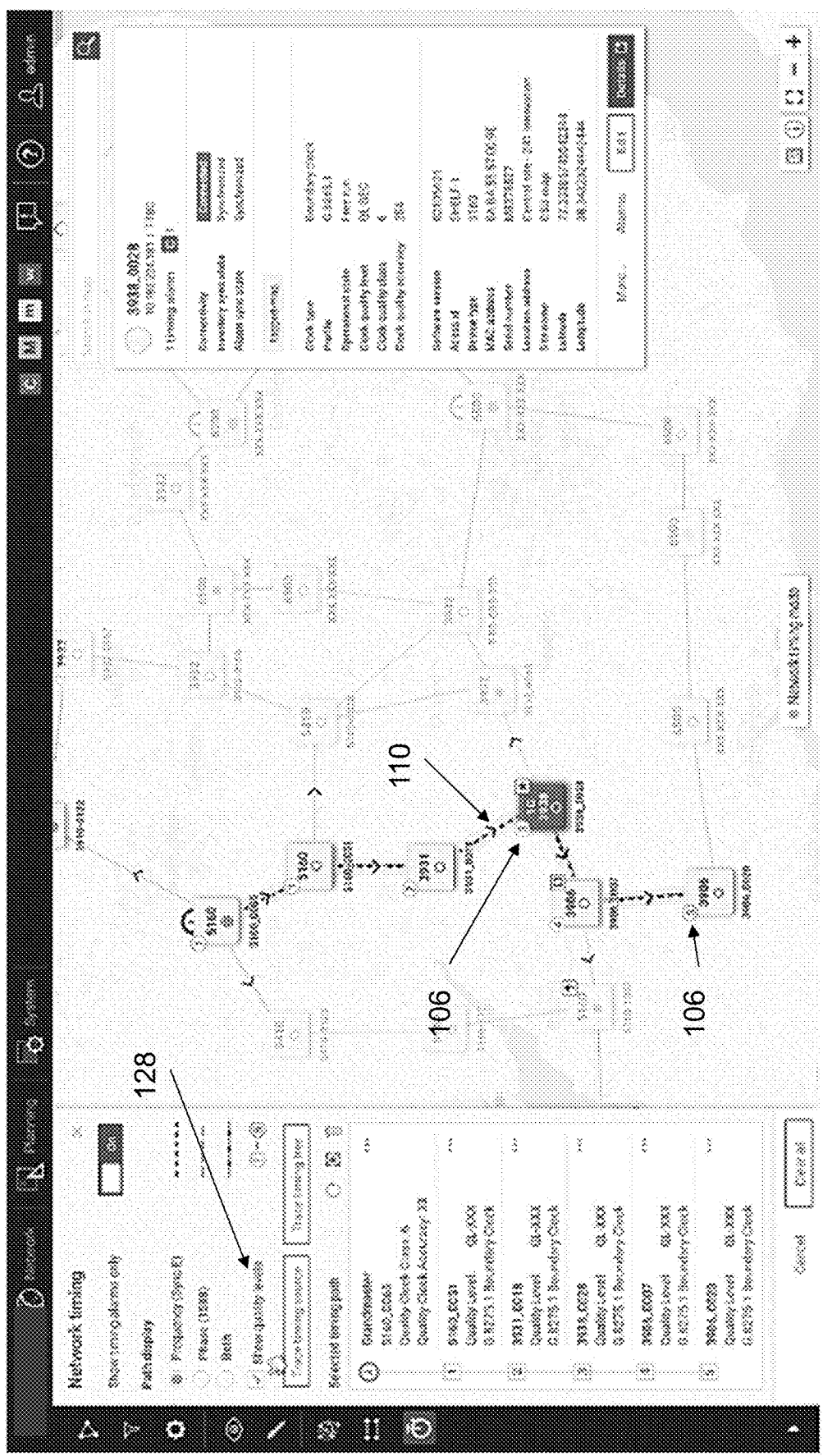
Figure 5N:
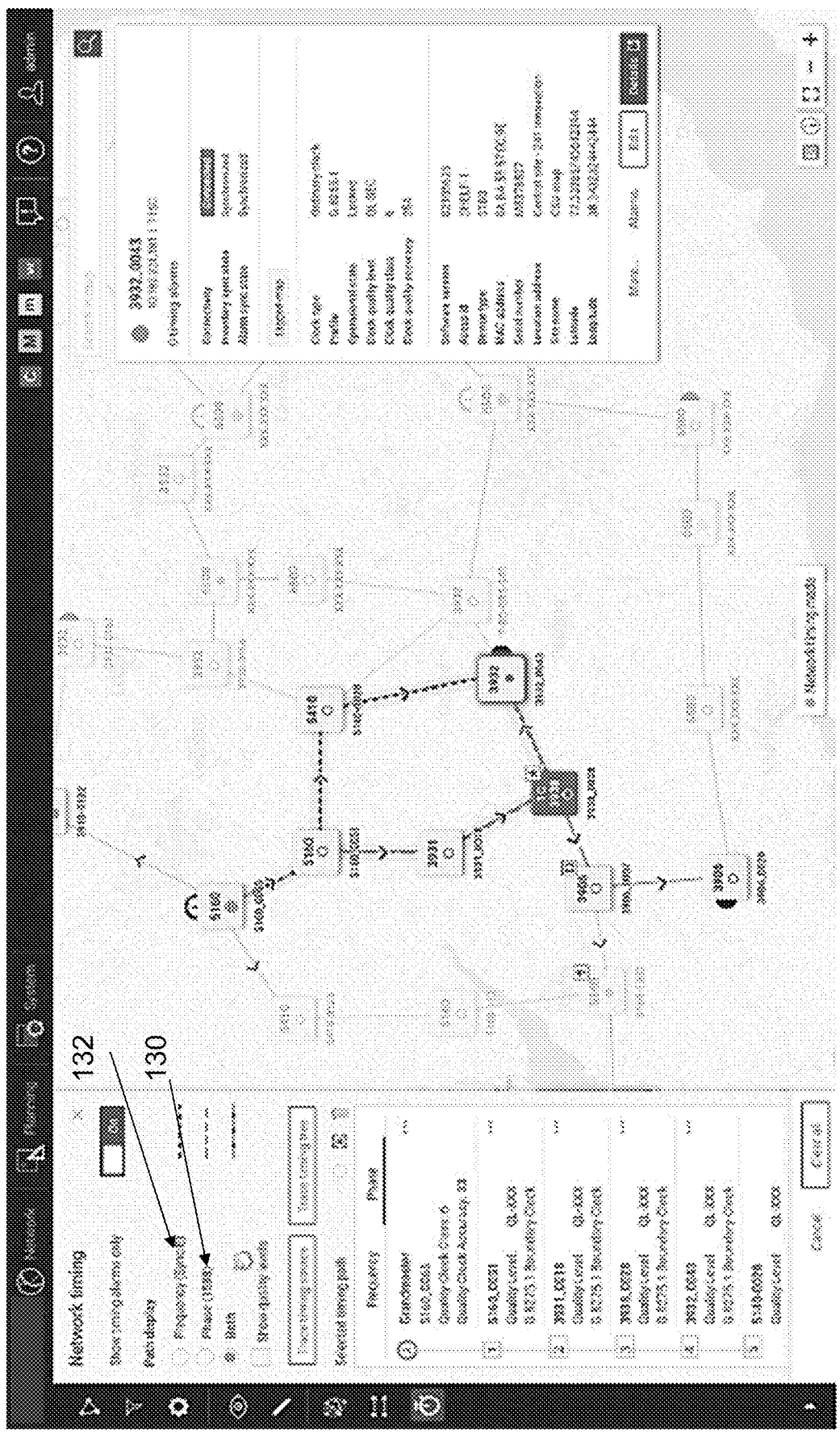

In FIG. 5M, a user may use the show quality level button 128 to toggle the QL 106 markers on the map for each NE 102 in the path 110. The user may also toggle the phase button 130 and the frequency button 132 or both (shown in FIG. 5N).

FIG. 6 includes screenshots (FIG. 6A-6G) which show a use case of the network timing trail GUI 100 of the present disclosure. FIG. 6A shows a network map with the network timing mode button 134 selected, thus placing the map in network timing mode. In FIG. 6B an NE 102 is selected and the legend popup 118 is shown to view icons for objects and states. In FIG. 6C, the user selects the "show timing alarms only" button 134 to instruct the map to show timing alarms only. The trace timing source button 120 is selected in FIG. 6D for the selected NE 102. The timing path 110 highlights to show the source path to the GM clock. Timing path details for the path 110 are listed in the drawer panel 112. The display is set to show both phase and frequency in the options but in this case the path is using only frequency and is shown as a dashed pattern on the highlighted path 110. The user may further visualize on the map what protocols are used and see the end-to-end path details for each protocol. For a selected NE 102, the detail pod 104 also provides detailed settings for both phase 1588 and frequency sync-e.

Figure 6A:
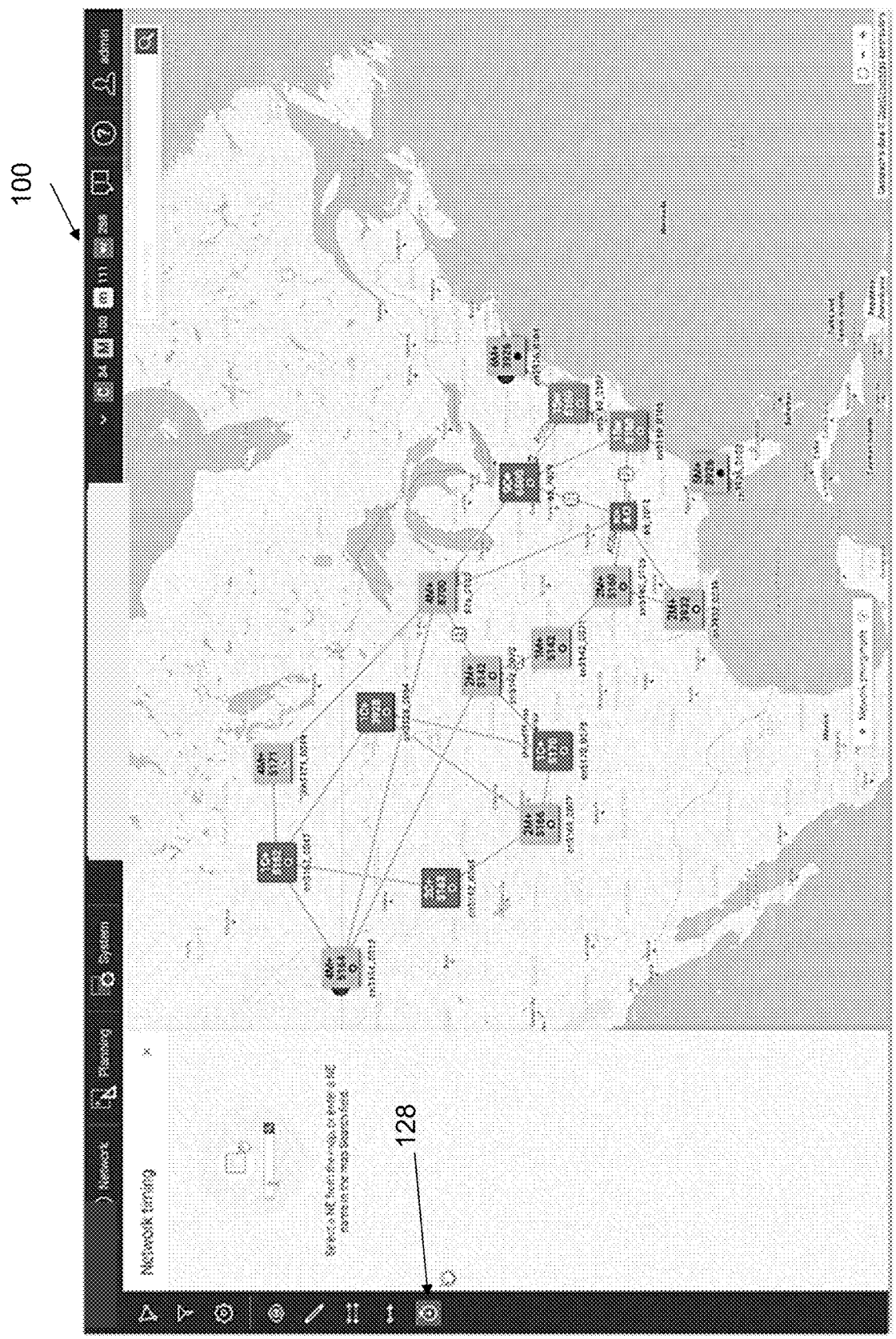
FIG. 6 includes screenshots (FIG. 6A-6G) which show a use case of the network timing trail interface of the present disclosure.
Figure 6B:
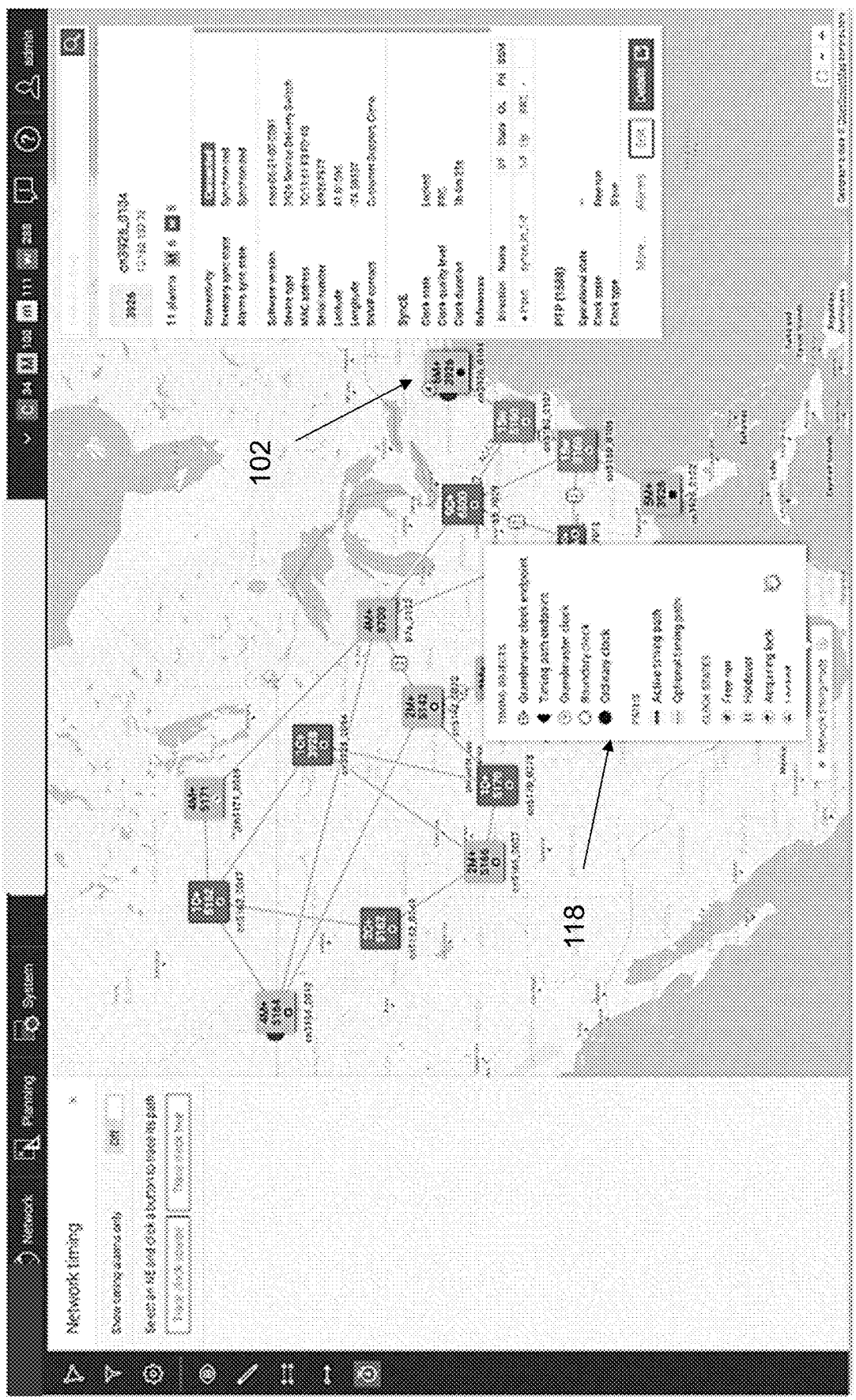
Figure 6C:
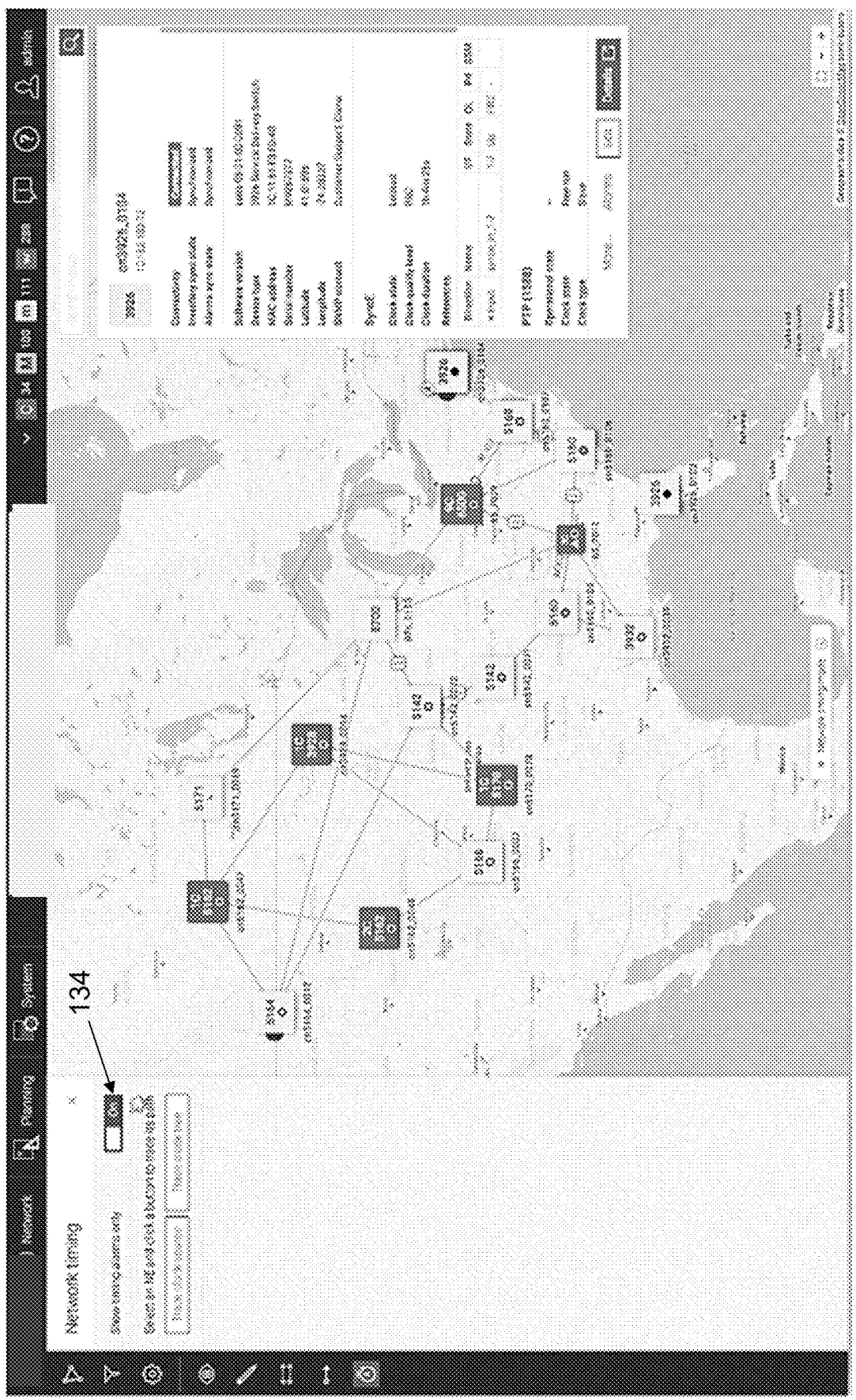
Figure 6D:
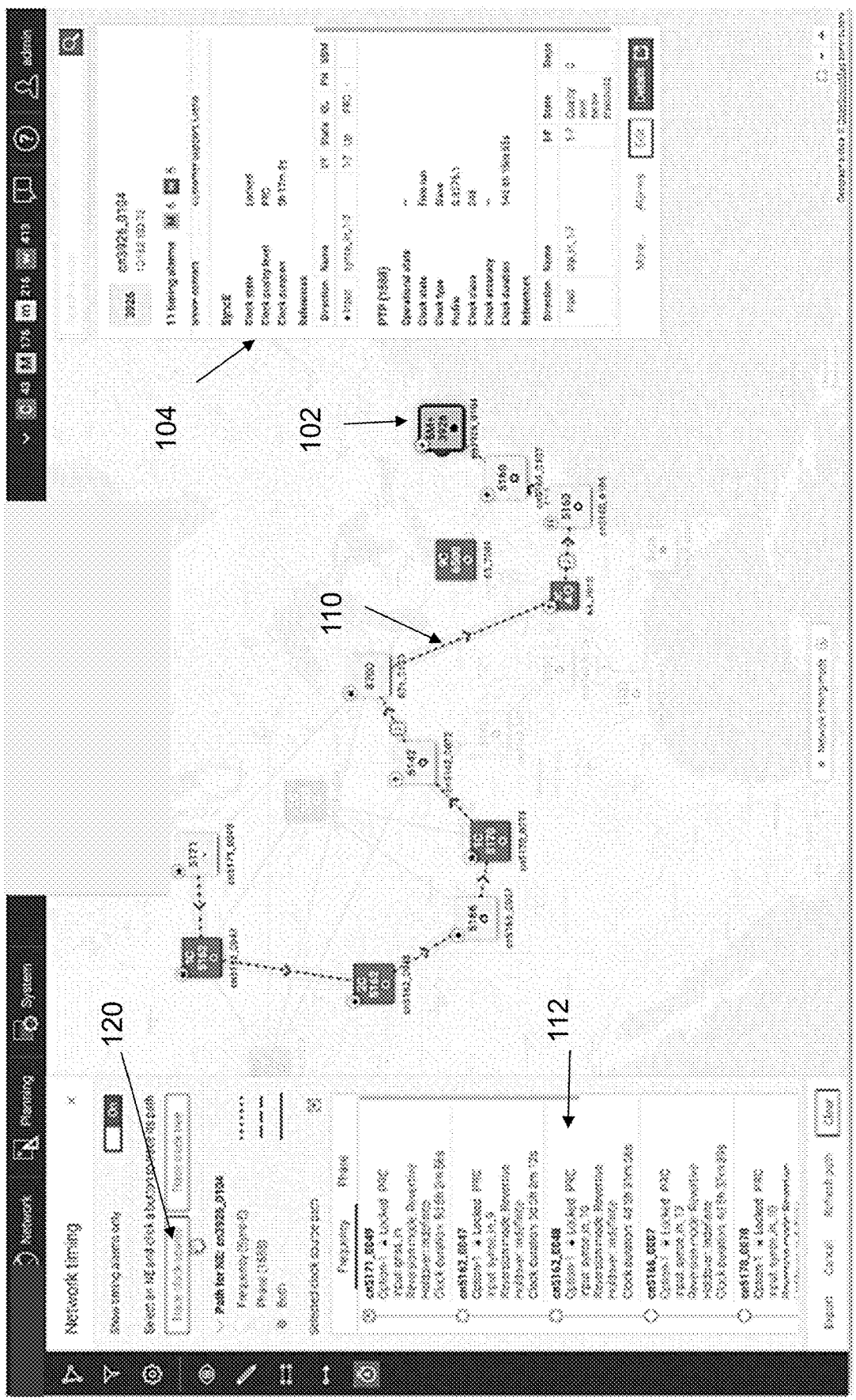
Figure 6E:
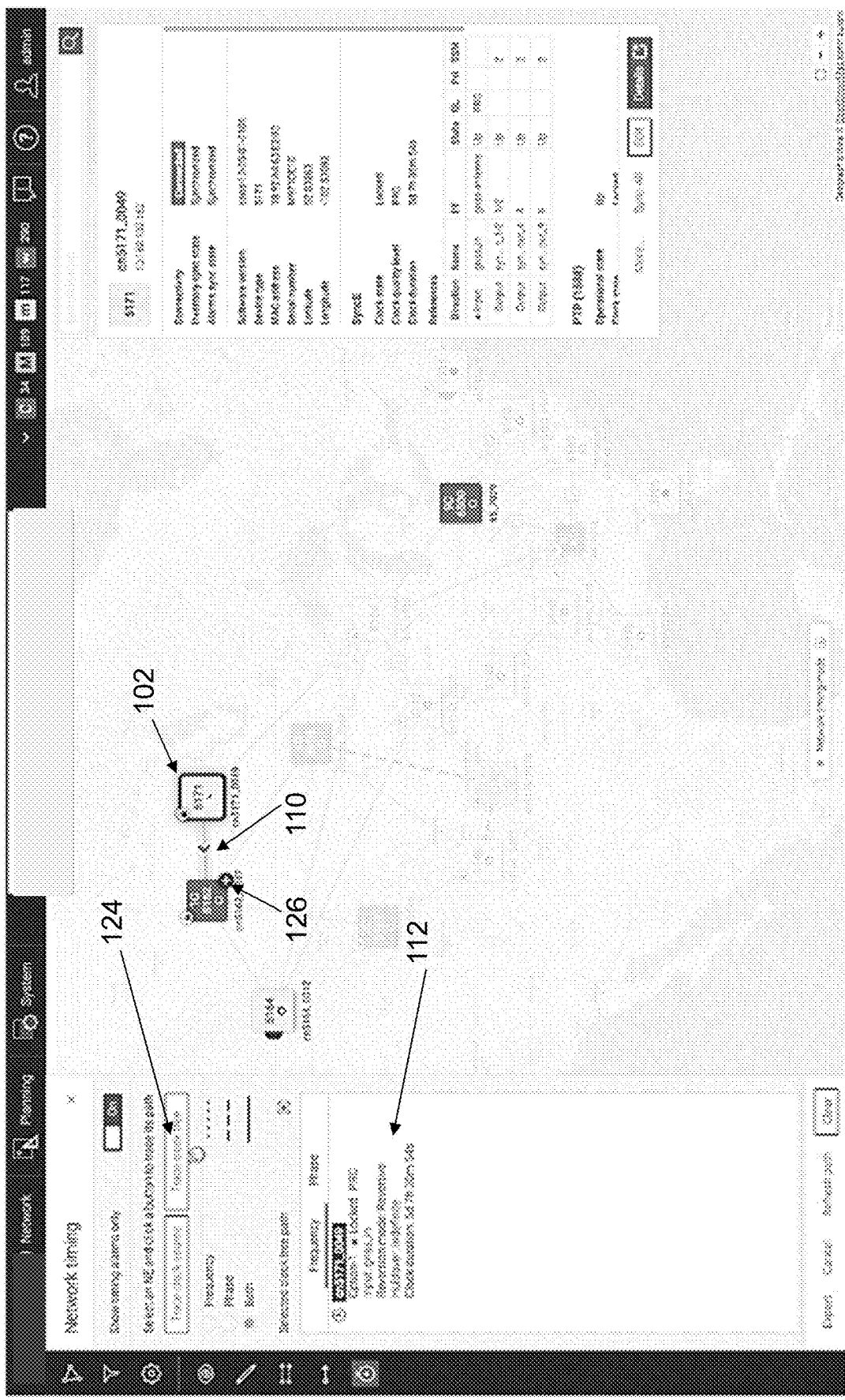
Figure 6F:
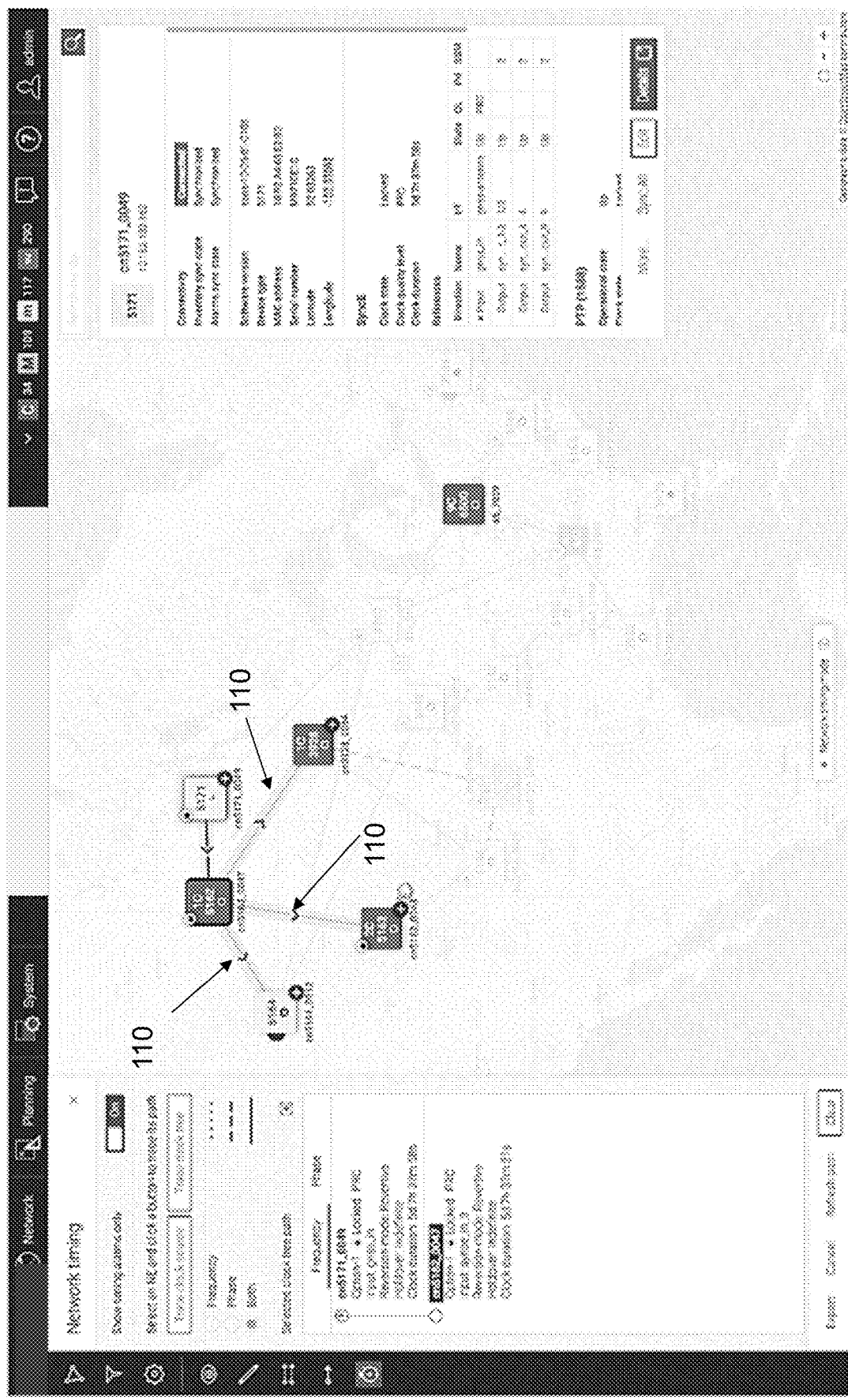
Figure 6G:
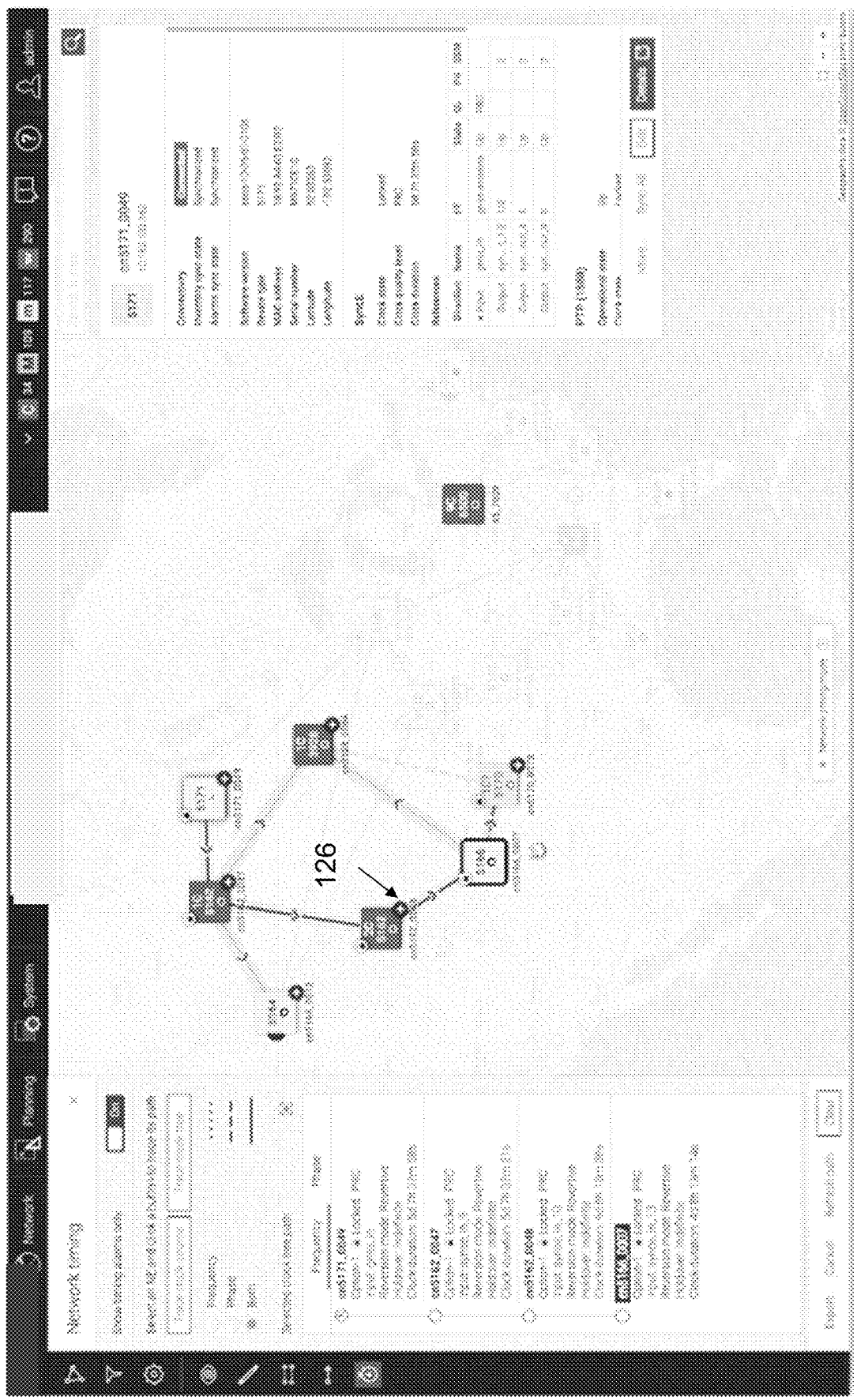

The trace clock tree button 124 is selected in FIG. 6E, for a selected NE 102. In this case, the selected NE 102 is a GM clock and its timing paths 110 are shown. Timing path details for the path 110 are listed in the drawer panel 112. Again the plus button 126 can be selected to view more path options to discover the timing tree. The plus button 126 is selected in FIG. 6F to view more path options 110 to discover the timing tree. In FIG. 6G, the plus button 126 is again selected to view more path options, in this case the path encounters an NE 102 that is not connected.

The various embodiments of the invention of the present disclosure makes novel use of 3D multi-layer service/topology visualization combined with separate network timing Frequency and Phase visualization/animation plus concurrent visualization of potentially different multi-layer routes for each Frequency and Phase. Additionally, the invention provides the novel ability to break-out entities within a given network layer into their own respective layer for the purposes of 3D multi-layer visualization. 2D and 3D multi-layer service/topology visualization combined with modeled 3rd party network timing entity context is utilized. As well, supporting discrete 3rd party network timing devices and logical 3rd party network timing domains each with topological connectivity to natively managed network timing devices to create enriched end-user network timing context. Various embodiments utilize 3D multi-layer service/topology visualization with the addition to interactively and dynamically explore and build out a network timing tree 3D multi-layer visualization.

Figure 7:
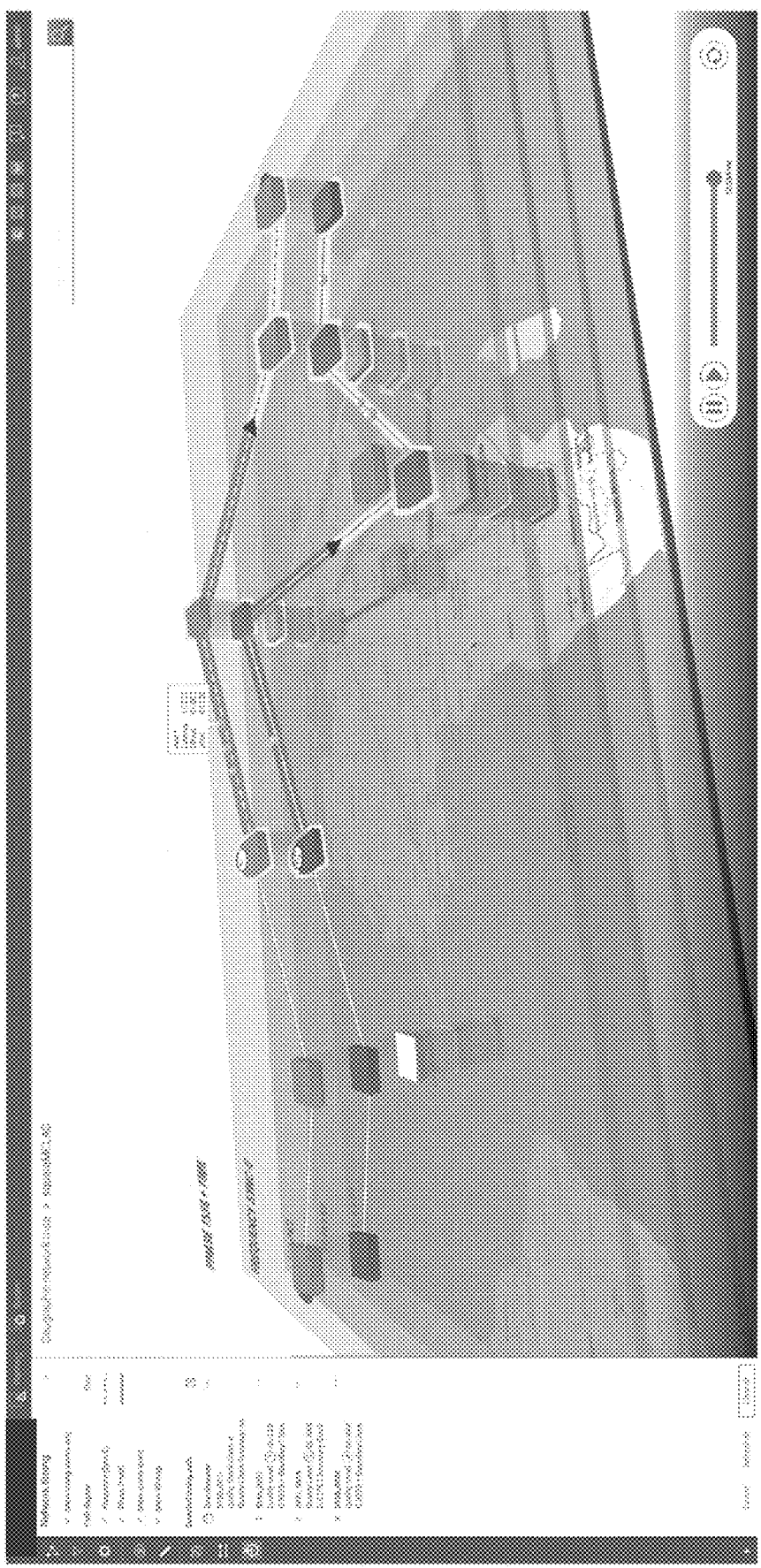
FIG. 7 shows an embodiment of the 3D multi-layer network timing construct visualization of the present disclosure.

The present disclosure includes creating an algorithm which combines the construction of an initial cache of a multi-layer nodal, topological, configuration, and state network timing construct view used for an initial 2D/3D multi-layer network timing construct visualization, continually monitors for network state and configuration changes which could impact the network timing construct visualization, updates the cached view, and then automatically updates the 2D/3D multi-layer network timing construct visualization. Also, creating a timing source conflict analyzer algorithm which evaluates multi-layer nodal/link topology, SRLG, and 3rd party network timing entity connectivity. FIG. 7 shows an embodiment of the 3D multi-layer network timing construct visualization of the present disclosure.

In various embodiments, FIG. 8 can be realized as a method 800 having steps, via a system including at least one processor and memory with instructions that, when executed, cause the at least one processor to implement the steps, and as a non-transitory computer-readable medium having instructions stored thereon for programming at least one processor to perform the steps. The steps include obtaining 802 timing information from a plurality of network elements (NEs) in a network. The timing information can include a timing distribution protocol and any upstream or downstream network elements in timing paths which are a path illustrating distribution of timing from a clock source. Additional steps include displaying 804 a map in a graphical user interface (GUI) visualizing timing paths in the network between the plurality of network elements. The map may be a 3D multi-layer visualization. Further steps include receiving 806 input from a user and adjusting the map based therein, wherein the input is used to explore any of the timing paths for troubleshooting thereof. The steps may further include causing 808 a switch of timing paths from a network element based on input. Displaying visual indicators for clock states and clock types on the map, displaying a timing path that includes a highlighted path and arrows showing a direction from a clock source, and displaying quality indicators of a clock at one or more network elements are additional features of the GUI of the present disclosure.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium comprising instructions that, when executed, cause one or more processors to perform steps of:
    obtaining timing information from a plurality of network elements (NEs) in a network;
    displaying a map in a graphical user interface (GUI) visualizing timing paths in the network between the plurality of network elements; and
    receiving input from a user via one or more selections in the GUI and adjusting the map based on the one or more selections, wherein the selections include a network element, a timing source to show a timing path to the network element, and various possible timing paths to the network element, and wherein the one or more selections include one of frequency distribution, phase distribution, and both frequency and phase distribution.

2. The non-transitory computer-readable medium of claim 1, wherein the steps further include
    causing a switch of timing paths from a network element based on input.

3. The non-transitory computer-readable medium of claim 1, wherein the timing information includes a timing distribution protocol and any upstream or downstream network elements in timing paths which are a path illustrating distribution of timing from a clock source.

4. The non-transitory computer-readable medium of claim 1, wherein the steps further include
    displaying visual indicators for clock states and clock types on the map and, based on selection of a network element, displaying a detail pod displays various information about the selected network element including details of the clock states and clock types for the selected network element and configurable options.

5. The non-transitory computer-readable medium of claim 1, wherein the steps further include
    displaying a timing path that includes a highlighted path and arrows showing a direction from a clock source.

6. The non-transitory computer-readable medium of claim 1, wherein the steps further include
    displaying quality indicators of a clock at one or more network elements.

7. The non-transitory computer-readable medium of claim 1, wherein the map is a 3D multi-layer visualization of Layer 0, 1 and 2 devices.

8. The non-transitory computer-readable medium of claim 1, wherein the steps further include
    determining any conflicts in the network utilizing shared risks in the network.

9. A method comprising the steps of:
    obtaining timing information from a plurality of network elements (NEs) in a network;
    displaying a map in a graphical user interface (GUI) visualizing timing paths in the network between the plurality of network elements; and
    receiving input from a user via one or more selections in the GUI and adjusting the map based on the one or more selections, wherein the selections include a network element, a timing source to show a timing path to the network element, and various possible timing paths to the network element, and wherein the one or more selections include one of frequency distribution, phase distribution, and both frequency and phase distribution.

10. The method of claim 9, wherein the steps further include causing a switch of timing paths from a network element based on input.

11. The method of claim 9, wherein the timing information includes a timing distribution protocol and any upstream or downstream network elements in timing paths which are a path illustrating distribution of timing from a clock source.

12. The method of claim 9, wherein the steps further include
    displaying visual indicators for clock states and clock types on the map and, based on selection of a network element, displaying a detail pod displays various information about the selected network element including details of the clock states and clock types for the selected network element and configurable options.

13. The method of claim 9, wherein the steps further include
    displaying a timing path that includes a highlighted path and arrows showing a direction from a clock source.

14. The method of claim 9, wherein the steps further include
    displaying quality indicators of a clock at one or more network elements.

15. The method of claim 9, wherein the map is a 3D multi-layer visualization of Layer 0, 1 and 2 devices.

16. An apparatus comprising:
    one or more processors; and
    memory storing instructions that, when executed, cause the one or more processors to obtain timing information from a plurality of network elements (NEs) in a network;
        display a map in a graphical user interface (GUI) visualizing timing paths in the network between the plurality of network; and
        receiving input from a user via one or more selections in the GUI and adjust the map based on the one or more selections, wherein the selections include a network element, a timing source to show a timing path to the network element, and various possible timing paths to the network element, and wherein the one or more selections include one of frequency distribution, phase distribution, and both frequency and phase distribution.

17. The apparatus of claim 16, wherein the instructions that, when executed, further cause the one or more processors to
cause a switch of timing paths from a network element based on input.

18. The apparatus of claim 16, wherein the timing information includes a timing distribution protocol and any upstream or downstream network elements in timing paths which are a path illustrating distribution of timing from a clock source.

19. The apparatus of claim 16, wherein the instructions that, when executed, further cause the one or more processors
display visual indicators for clock states and clock types on the map, and quality indicators of a clock at one or more network elements and, based on selection of a network element, displaying a detail pod displays various information about the selected network element including details of the clock states and clock types for the selected network element and configurable options.

20. The apparatus of claim 16, wherein the instructions that, when executed, further cause the one or more processors
displaying a timing path that includes a highlighted path and arrows showing a direction from a clock source.

* * * * *